United States Patent [19]
Amano et al.

[11] Patent Number: 6,100,996
[45] Date of Patent: *Aug. 8, 2000

[54] IMAGE PROCESSING APPARATUS AND METHOD, PRINT CONTROL APPARATUS AND METHOD, AND PRINTER

[75] Inventors: Yasuko Amano, Inagi; Koichiro Akimoto, Fujisawa; Nobuyasu Itoh, Yokohama; Shinichiro Maekawa, Kawasaki; Nobuyoshi Kakigi, Sakura; Masami Kurimoto, Yamato, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/812,712

[22] Filed: Mar. 6, 1997

[30] Foreign Application Priority Data

Mar. 8, 1996 [JP] Japan .................................... 8-051736
Mar. 28, 1996 [JP] Japan .................................... 8-097378

[51] Int. Cl.[7] ..................................................... H04N 1/04
[52] U.S. Cl. ............................ 358/1.9; 358/1.14; 358/296
[58] Field of Search ............................. 382/304; 395/113, 395/114; 358/296, 1.14, 1.15, 1.16, 1.17, 1.18, 1.9, 1.6

[56] References Cited

U.S. PATENT DOCUMENTS

| | | | |
|---|---|---|---|
| 5,625,757 | 4/1997 | Kageyama et al. | 395/112 |
| 5,629,771 | 5/1997 | Mikami | 358/296 |
| 5,706,411 | 1/1998 | McCormick et al. | 395/113 |

*Primary Examiner*—Amelia Au
*Assistant Examiner*—Vikkram Bali
*Attorney, Agent, or Firm*—Fitzpatrick, Cella, Haper & Scinto

[57] ABSTRACT

When a status change of a printer engine occurs, a status change signal is output to an image data output apparatus. In response to input of the status change signal, the image data output apparatus inquires or confirms the printer engine what kind of status change occurs so that processing to compensate for the status change will be subject to image data to be output to the printer engine.

20 Claims, 22 Drawing Sheets

FIG. 6A

| 0 | 8 | 2 | 10 |
|---|---|---|----|
| 12 | 4 | 14 | 6 |
| 3 | 11 | 1 | 9 |
| 15 | 7 | 13 | 5 |

FIG. 6B

| 11 | 4 | 6 | 9 |
|----|---|---|---|
| 12 | 0 | 2 | 14 |
| 7 | 8 | 10 | 5 |
| 3 | 15 | 13 | 1 |

FIG. 6C

| 6 | 7 | 8 | 9 |
|---|---|---|---|
| 5 | 0 | 1 | 10 |
| 4 | 3 | 2 | 11 |
| 15 | 14 | 13 | 12 |

FIG. 22

| K TONER DENSITY | Y TONER DENSITY | M TONER DENSITY | C TONER DENSITY |
|---|---|---|---|
| 1 | 1 | 1 | 1 |
| 2 | 2 | 2 | 2 |
| 3 | 3 | 3 | 3 |
| 4 | 4 | 4 | 4 |
| 5 | 5 | 5 | 5 |
| 25 | 23 | 22 | 21 |
| 26 | 23 | 23 | 22 |
| 27 | 24 | 23 | 23 |

K-YMC CONVERSION TABLE

IMAGE PROCESSING APPARATUS AND METHOD, PRINT CONTROL APPARATUS AND METHOD, AND PRINTER

BACKGROUND OF THE INVENTION

1. Field of the Invention

This invention relates to an image processing apparatus and an image processing method and, more particularly, to an image processing apparatus and an image processing method in which an input image is processed and supplied to an image output apparatus so that the processed image will be output from the image output apparatus.

It also relates to image formation means for forming images onto printing paper through a plurality of previously-assigned, individual processings, a printer provided with control means for controlling the image formation means, and a print control apparatus and a print control method used in the printer.

2. Related Background Art

In the conventional, identical dither matrix and γ correction method are used, regardless of individual conditions, such as the status of a printer engine to be used, the type of image to be output (e.g., character, graphic or bit map image), aged changes, and the type of recording medium.

Therefore, the following problems arise in the conventional.

1) Since information on the printer engine's status is used only for warning to the user, a shortage of toner causes the printer to continuously output faint images with low toner density unless the toner is supplied, for example, by replacing the toner cartridge.

2) Since an identical dither matrix is used regardless of the type of image to be output, the print quality may be lowered depending on the type of image.

3) Since an identical y correction method is used regardless of aged changes, the image quality may deteriorate with the aged changes.

4) Since the identical dither matrix is used regardless of the type of recording medium, there may occur inconvenience to use. For example, the use of an OHP sheet as the recording medium causes low transmittance.

Generally, printers are classified into various types such as ink-jet type, thermal transfer type, and electrophotographic type. For example, the electrophotographic type includes laser beam printers.

Such printers typically have image formation means (hereinafter, referred to as a printer engine) for forming images onto printing paper through a plurality of previously-assigned, individual processings, and control means (hereinafter, referred to as a printer controller) for controlling the printer engine.

Specifically, the printer controller is communicably connected to external equipment such as a host computer, which analyzes print information sent from the external equipment and generates printable image data to be sent to the printer engine. The printer controller also issues control instructions related to the printing to be performed by the printer engine.

The printer engine prints out the image data sent from the printer controller in accordance with the control instructions from the printer controller. All the processing to be performed in this printing process, such as paper feeding and printing, is controlled by an engine control unit.

Referring to FIG. 23, a laser beam printer will be taken from the above printers by way of example to describe a configuration of a printer controller and a printer engine. FIG. 23 is a block diagram showing a configuration of a printer controller and a printer engine in a conventional laser beam printer.

As shown in FIG. 23, the conventional laser beam printer includes a printer controller 501 and a printer engine 502.

The printer controller 501 is communicably connected to external equipment (not shown) such as a host computer so that instructions and responses can be exchanged therebetween. The printer controller 501 also performs the following processing steps of: receiving print information from the external equipment; analyzing the received print information to expand it into printable image data; transferring the image data to the printer engine 502; and exchanging instructions and responses with the printer engine 502 connected to the printer controller 501 through a serial communication line.

The printer engine 502 prints out the image data sent from the printer controller 501 in accordance with control instructions from the printer controller 501. All the processing to be performed in this printing process is controlled by an engine control unit 503.

Control processing by the engine control unit 503 includes paper feeding control processing of printing paper; paper conveying control processing of the printing paper; control processing in an optical system, including control processing to drive a scanner motor and laser light used for forming an electrostatic latent image onto a photoconductive drum; temperature control of a fixing device for fixing a toner image transferred onto the printing paper; and other control processing in the fixing device including temperature abnormality detection.

In the paper feeding control processing of the printing paper, the type and the size of feedable printing paper, and the presence or absence of such feedable printing paper are detected on the basis of detection signals from a paper size detecting unit 403, a paper detecting unit 404 of a paper feeding unit, and an option detecting unit 405, respectively. Then a cassette or an option control unit 409 is instructed to feed printing paper of the designated type and size.

The paper size detecting unit 403 detects the size of the printing paper within a paper cassette currently set to output a detection signal indicative of the detection result. The paper detecting unit 404 of the paper feeding unit detects the presence or absence of respective paper feeding ports of the cassette, a hand feeder, an option cassette, and an envelop feeder, to output detection signals indicative of the detection results. The option detecting unit 405 detects the connecting status of options of the option cassette and the envelop feeder to output detection signals indicative of the detection results. The option control unit 409 instructs the options of the option cassette and the envelop feeder to operate in accordance with control instructions from the engine control unit 503.

In the paper conveying control processing of the printing paper, control instructions are issued to a paper conveying control unit 406 to convey the printing paper along a required conveying path on the basis of detection signals from a sensor input unit 410 that detects the presence or absence of the printing paper within conveying paths for registration, paper ejection, both-side printing and reversed printing. The paper conveying control unit 406 instructs conveying motors to drive conveying rollers, arranged in the respective conveying paths, in accordance with the control instructions from the engine control unit 503.

In the optical system control processing, status signals indicative of the status of the optical system are taken in from an optical system control unit 407, and control instructions to the optical system control unit 407 are generated on the basis of the status signals. The optical system control unit 407 instructs drivers for a scanner motor and a laser to operate in accordance with the control instructions from the engine control unit 503.

In the fixing device control processing, a status signal is taken in from a fixing device temperature control unit 408, the temperature of the fixing device is monitored on the basis of the status signal, and a control instruction is issued to the fixing device temperature control unit 408 to control a heater of the fixing device to be a fixing temperature within a predetermined range. When detecting occurrence of abnormality such as temperature abnormality due to a trouble in the heater of the fixing device, a control instruction is generated to stop operation of the fixing device. The fixing device temperature control unit 408 instructs the source of trouble such as the heater of the fixing device to operate in accordance with the control instruction from the engine control unit 503.

The engine control unit 503 executes all the control processing on the basis of signals exchanged with the printer controller 501. Such signals includes those denoted in FIG. 23 as /CPRDY411, /PPRDY412, /RDY413, /PRNT414, /VSREQ415, /VSYNC416, /BD417, /SCLK418, /CMD419, /CBSY420, /STS421, and /SBSY422.

The signal /CPRDY411 indicates that the printer controller 501 is in a communicable state to the engine control unit 503. The signal /PPRDY412 indicates that the engine control unit 503 is in a standby state in which the engine control unit 503 is communicable with the printer controller 501.

The signal /RDY413 is a signal indicating whether or not the engine control unit 503 is in a standby state in which the engine control unit 503 maintains a printable state. This signal is set to "TRUE" when the status of all the processing in the printing process satisfies preset conditions, or to "FALSE" when the status of all the processing in the printing process does not satisfy the preset conditions, i.e., when the engine control unit 503 is in an abnormal state in which the printing process can not be executed normally.

The signal /PRNT414 indicates that the printer controller 501 requests the engine control unit 503 to start printing. The signal /VSREQ415 indicates that the engine control unit 503 requests the printer controller 501 to generate a vertical synchronizing signal. The signal /VSYNC416 is the vertical synchronizing signal that is output from the printer controller 501 to the engine control unit 503 in response to the signal /VSREQ415. The signal /BD417 is a horizontal synchronizing signal that is output from the printer controller 501 to the engine control unit 503. The signal /SCLK418 is a synchronizing clock signal for synchronizing serial communication between the printer controller 501 and the engine control unit 503.

The signal /CMD419 is a command signal sent from the printer controller 501 to the engine control unit 503. The signal /CBSY420 is a strobe signal for outputting the signal /CMD419. The signal /STS421 is a signal output in response to the signal /CMD419, indicating the internal status of the printer engine 502. The signal /SBSY422 is a signal for outputting the signal /STS421.

A description will be made next to how the printer controller 501 controls the printer engine 502.

The engine control unit 503 performs printing under control of the printer controller 501. If the printing process is executable normally, the /RDY signal of "TRUE" is output. If not executable, i.e., when an abnormal state such as a paper jam occurs and it requires the engine control unit 503 to stop printing, the /RDY signal of "FALSE" is output.

The printer controller 501 monitors the signals /RDY413 and /STS421 from the engine control unit 503, and recognizes a change in status of the printer engine 502 to control the printer engine 502 in accordance with the change in the status. For example, when the /RDY signal is "FALSE", the /RDY signal is used as a trigger signal to detect occurrence of abnormality in the printer engine 502 (e.g., paper jam), and the signal /CMD419 is output to the printer engine 502 so that the current processing will be stopped.

On the other hand, the signal /STS421 in each processing is read out by polling or the like, and a status change that does not directly concern the /RDY signal is recognized by the signal /STS421. When occurrence of an error in the printer engine 502 is detected through the recognition of the status change, the signal /CMD419 is output to the printer engine 502 so that the current processing will be stopped.

The engine control unit 503 controls the printer engine 502 to stop all the processing in the printing process in response to input of the signal /CMD419. The printer engine 502 maintains the stop state until either the /RDY signal is recovered from the "FALSE" state to the normal "TRUE" state, or elimination of the error is detected by the signal /STS421.

When the occurrence of the error is detected by the signal /STS421, the engine control unit 503 can control the printer engine 502 to skip the processing in which the error occurs, so that the printer engine 502 advances the subsequent processing without stopping the operation.

As previously described, according to the conventional control method, when occurrence of an abnormal state of the printer engine 502 such as a paper jam is detected by the /RDY signal from the engine control unit 503, the printer controller 501 instructs the printer engine 502 to stop the processing on purpose to deal with the occurrence of the abnormal state. Therefore, unsuitable printout can be prevented. Similarly, when occurrence of an error in a state that does not directly concern the /RDY signal is detected by the signal /STS421 in each processing, the printer controller 501 instructs the printer engine 502 to stop the processing regardless of contents of the error on purpose to prevent unsuitable printout. In this case, the processing to deal with the occurrence of the error in the state that does not concern the /RDY signal is determinate and cannot cope with the occurrence of the error flexibly. In other words, the processing to deal with a status change due to the occurrence of the abnormality or error in the printer engine 502 is determinately executed to stop the processing in the printer engine 502, and cannot cope with the occurrence of the error in the printer engine 502 flexibly.

Further, since error detection in the state that does not directly concern the /RDY signal is done on the basis of the signal /STS421 in each processing, the signal /STS421 always needs to be read out by polling and this causes an increased load on the printer controller 501.

SUMMARY OF THE INVENTION

The present invention has been made in consideration of the above problems, and an object thereof is to provide an image processing apparatus and an image processing method capable of changing a rule of image processing to obtain a proper output image.

An image processing apparatus according to the present invention, in which an input image is processed and supplied to image output means so that the processed image will be output from the image output means, includes acquisition means for obtaining status information of the image output means; a plurality of processing means each for processing the input image according to each given rule; and selection means for selecting any one of the plurality of processing means in accordance with the status information so that the input image will be processed by the selected processing means.

Preferably, the image processing apparatus according to the present invention includes the following characteristics. In the image processing apparatus according to the present invention, the plurality of processing means preferably include binarization means each for binarizing a multi-valued image using a dither method, each binarization means binarizing the multi-valued image according to each different rule.

In the image processing apparatus according to the present invention, the status information preferably includes output density information indicative of a change in density of an image to be output from the image output means, such that the selection means selects one of processing means to correct the change in the density of the image to be output from the image output means.

In the image processing apparatus according to the present invention, preferably the image output means outputs the image in an electrophotographic process and the output density information includes information on a shortage of developer.

In the image processing apparatus according to the present invention, the status information preferably includes aged change information indicative of an aged change of the image output means, such that the selection means selects one of the processing means to correct the aged change of the image output means.

In the image processing apparatus according to the present invention, the plurality of processing means preferably include γ correction means each for making a γ correction of the image supplied to the image output means according to each different rule.

In the image processing apparatus according to the present invention, the status information preferably includes aged change information indicative of an aged change of the image output means, such that the selection means selects one of the processing means to correct the aged change of the image output means.

An image processing apparatus according to a second aspect of the present invention, in which an input image is processed and supplied to image output means so that the processed image will be output from the image output means, includes determination means for determining a descriptive format of the input image; a plurality of processing means each for processing the input image according to each given rule; and selection means for selecting any one of the plurality of processing means in accordance with the descriptive format of the input image so that the input image will be processed by the selected processing means.

Preferably, the image processing apparatus according to the second aspect of the present invention includes the following characteristics. In the image processing apparatus according to the second aspect of the present invention, the determination means preferably determines whether the input image is a character, a graphic, or a bit map image.

In the image processing apparatus according to the second aspect of the present invention, preferably the determination means determines which area each pixel of the input image is located, the character area, the graphic area or the bit map image area, and the selection means selects one of the plurality of processing means for each pixel.

In the image processing apparatus according to the second aspect of the present invention, the plurality of processing means preferably include binarization means each for binarizing a multi-valued image using a dither method, each binarization means binarizing the multi-valued image according to each different rule.

An image processing apparatus according to a third aspect of the present invention, in which an input image is processed and supplied to image output means so that the processed image will be output from the image output means, includes acquisition means for obtaining type information indicative of the type of recording medium used in the image output means; a plurality of processing means each for processing the input image according to each given rule; and selection means for selecting any one of the plurality of processing means in accordance with the type information so that the input image will be processed by the selected processing means.

Preferably, the image processing apparatus according to the third aspect of the present invention includes the following characteristics. In the image processing apparatus according to the third aspect of the present invention, the plurality of processing means preferably include binarization means each for binarizing a multi-valued image using a dither method, each binarization means binarizing the multi-valued image according to each different rule.

In the image processing apparatus according to the third aspect of the present invention, the type information preferably includes information indicative of whether or not the recording medium used in the image output means has high transmittance.

An image processing apparatus according to a fourth aspect of the present invention, in which an input image is processed and supplied to image output means so that the processed image will be output from the image output means, includes acquisition means for obtaining information related to image output conditions in the image output means; a plurality of processing means each for processing the input image according to each given rule; and selection means for selecting any one of the plurality of processing means in accordance with the information related to the output conditions so that the input image will be processed by the selected processing means.

Preferably, the image processing apparatus according to the fourth aspect of the present invention includes the following characteristics. In the image processing apparatus according to the fourth aspect of the present invention, the plurality of processing means preferably include binarization means each for binarizing a multi-valued image using a dither method, each binarization means binarizing the multi-valued image according to each different rule.

In the image processing apparatus according to the fourth aspect of the present invention, the plurality of processing means preferably include γ correction means each for making a γ correction of the image supplied to the image output means according to each different rule.

An image processing method according to the present invention, in which an input image is processed and supplied to an image output apparatus so that the processed image will be output from the image output apparatus, includes a step of obtaining status information of the image output apparatus; plural steps of processing the input image according to each given rule; and a step of selecting any one of the plural processing steps in accordance with the status information so that the input image will be processed by the selected processing step.

An image processing method according to a second aspect of the present invention, in which an input image is processed and supplied to an image output apparatus so that the processed image will be output from the image output apparatus, includes a step of determining a descriptive format of the input image; plural steps of processing the input image according to each given rule; and a step of selecting any one of the plural processing steps in accordance with the descriptive format of the input image so that the input image will be processed by the selected processing step.

An image processing method according to a third aspect of the present invention, in which an input image is processed and supplied to an image output apparatus so that the processed image will be output from the image output apparatus, includes a step of obtaining type information indicative of the type of recording medium used in the image output apparatus; plural steps of processing the input image according to each given rule; and a step of selecting any one of the plural processing steps in accordance with the type information so that the input image will be processed by the selected processing step.

An image processing method according to a fourth aspect of the present invention, in which an input image is processed and supplied to an image output apparatus so that the processed image will be output from the image output apparatus, includes a step of obtaining information related to image output conditions in the image output apparatus; plural steps of processing the input image according to each given rule; and a step of selecting any one of the plural processing steps in accordance with the information related to the output conditions so that the input image will be processed by the selected processing step.

Another object of the present invention is to provide a printer, a print control apparatus and a print control method, which can flexibly cope with a status change due to occurrence of abnormality or error in each processing of image formation means and recognize the status change in each processing without any increased load.

A printer according to the present invention, provided with image formation means for forming images onto printing paper by executing a plurality of previously-assigned, individual processings, and control means for executing control processing for the image formation means, features that the image formation means includes status detection means for detecting status in each individual processing; and status change information generation means for generating status change information indicative of the presence or absence of a status change of the image formation means on the basis of the current and previous detection results by the status detection means, and that the control means includes status recognition means, which monitors the status change information and, when the status change information indicates the presence of a status change of the image formation means, recognizes the status-changed, individual processing and its changed status from among all the individual processings; and processing selection means for selecting an optimum processing to control the image formation means on the basis of the recognized individual processing and its changed status.

Therefore, the printer according to the present invention can flexibly cope with a status change due to occurrence of abnormality or error in the image formation means and recognize a status change in each processing without any increased load.

When the status recognition means recognizes a shortage of toner in toner supply processing, the selection means preferably selects, as the optimum processing, pseudo-gradation processing for the toner density of a color the toner of which becomes low.

When the status recognition means recognizes a shortage of toner in toner supply processing, the selection means preferably selects, as the optimum processing, density designation processing for the toner density of a color the toner of which becomes low. Therefore, a printout equivalent to that before the toner becomes low can be obtained.

When the status recognition means recognizes a shortage of black toner in toner supply processing, preferably the selection means uses the other color information, i.e., yellow, magenta and cyan information, as object information instead of black information by converting the black information into the other color information, and selects, as the optimum processing, processing to transfer the object information to the image formation means, the object information including the yellow, magenta and cyan information instead of the black information.

Therefore, a printout equivalent to that before the black toner becomes low can be obtained.

When the status recognition means recognizes that color of printing paper has been changed by paper feeding processing, the selection means preferably selects, as the optimum processing, pseudo-gradation processing for the change in color of the printing paper.

When the status recognition means recognizes that color of printing paper has been changed by paper feeding processing, the selection means preferably selects, as the optimum processing, density designation processing for the change in color of the printing paper. Therefore, a printout corresponding to the changed color of the printing paper can be obtained.

When the status recognition means recognizes an abnormal state in which image formation processing in the printer is not being executed normally, the selection means preferably selects, as the optimum processing, processing to immediately notify a user of the abnormal state.

A print control apparatus according to the present invention, used in a printer provided with status detection means for detecting status of a plurality of individual processings assigned to image formation processing to form an image onto printing paper, for controlling the image formation processing, includes status recognition means, which monitors status change information indicative of the presence or absence of a status change in the image formation processing, generated by the status detection means on the basis of the current and previous detection results, and when the status change information indicates that a status change is present in the image formation processing, which recognizes the status-changed, individual processing and its changed status from among all the individual processings; and processing selection means for selecting optimum processing to control the image formation processing on the basis of the recognized individual processing and its changed status.

When the status recognition means recognizes a shortage of toner in toner supply processing, the selection means preferably selects, as the optimum processing, pseudo-gradation processing for the toner density of a color the toner of which becomes low.

When the status recognition means recognizes a shortage of black toner in toner supply processing, preferably the selection means uses the other color information, i.e., yellow, magenta and cyan information, as object information instead of black information by converting the black information into the other color information, and selects, as the optimum processing, processing to transfer the object information to the printer, the object information including the yellow, magenta and cyan information instead of the black information.

When the status recognition means recognizes that color of printing paper has been changed by paper feeding processing, the selection means preferably selects, as the optimum processing, pseudo-gradation processing for the change in color of the printing paper.

When the status recognition means recognizes that color of printing paper has been changed by paper feeding processing, the selection means preferably selects, as the optimum processing, density designation processing for the change in color of the printing paper.

When the status recognition means recognizes an abnormal state in which image formation processing in the printer is not being executed normally, the selection means preferably selects, as the optimum processing, processing to immediately notify a user of the abnormal state.

A print control method according to the present invention, used in a printer provided with status detection means for detecting status of a plurality of individual processings assigned to image formation processing to form an image onto printing paper, for controlling the image formation processing, includes a step of monitoring status change information indicative of the presence or absence of a status change in the image formation processing, generated by the status detection means on the basis of the current and previous detection results, and when the status change information indicates that a status change is present in the image formation processing, to recognize the status-changed, individual processing and its changed status from among all the individual processings; and a step of selecting an optimum processing to control the image formation processing on the basis of the recognized individual processing and its changed status.

When a shortage of toner is recognized in toner supply processing, pseudo-gradation processing for the toner density of a color the toner of which becomes low is preferably selected as the optimum processing.

When a shortage of toner is recognized in toner supply processing, density designation processing for the toner density of a color the toner of which becomes low is preferably selected as the optimum processing.

When a shortage of black toner is recognized in toner supply processing, preferably the other color information, i.e., yellow, magenta and cyan information, is used as object information instead of black information by converting the black information into the other color information, and processing to transfer the object information to the printer is selected as the optimum processing, the object information including the yellow, magenta and cyan information instead of the black information.

When it is recognized that color of printing paper has been changed by paper feeding processing, pseudo-gradation processing for the change in color of the printing paper is preferably selected as the optimum processing.

When it is recognized that color of printing paper has been changed by paper feeding processing, density designation processing for the change in color of the printing paper is preferably selected as the optimum processing.

When an abnormal state in which image formation processing in the printer is not being executed normally is recognized, processing to immediately notify a user of the abnormal state is preferably selected as the optimum processing.

BRIEF DESCRIPTION OF THE DRAWINGS

The above and other objects and advantages and further description will now be discussed in connection with the drawings, in which:

FIGS. 6A, 6B and 6C are diagrams showing three examples of dither matrices each consisting of 4×4 pixels (with 16 gradations);

FIG. 22 is a diagram showing a K-YMC conversion table for converting K information into the other color information, namely, Y, M and C information, included in object information.

DETAILED DESCRIPTION OF THE PREFERRED EMBODIMENTS (First Embodiment)

A description will be made first to a structure of a laser beam printer taken as an example of an output apparatus to which embodiments of the present invention are applicable. It should be noted that the embodiments are also applicable to output apparatuses of other types such as an ink-jet printer.

Figure 1:
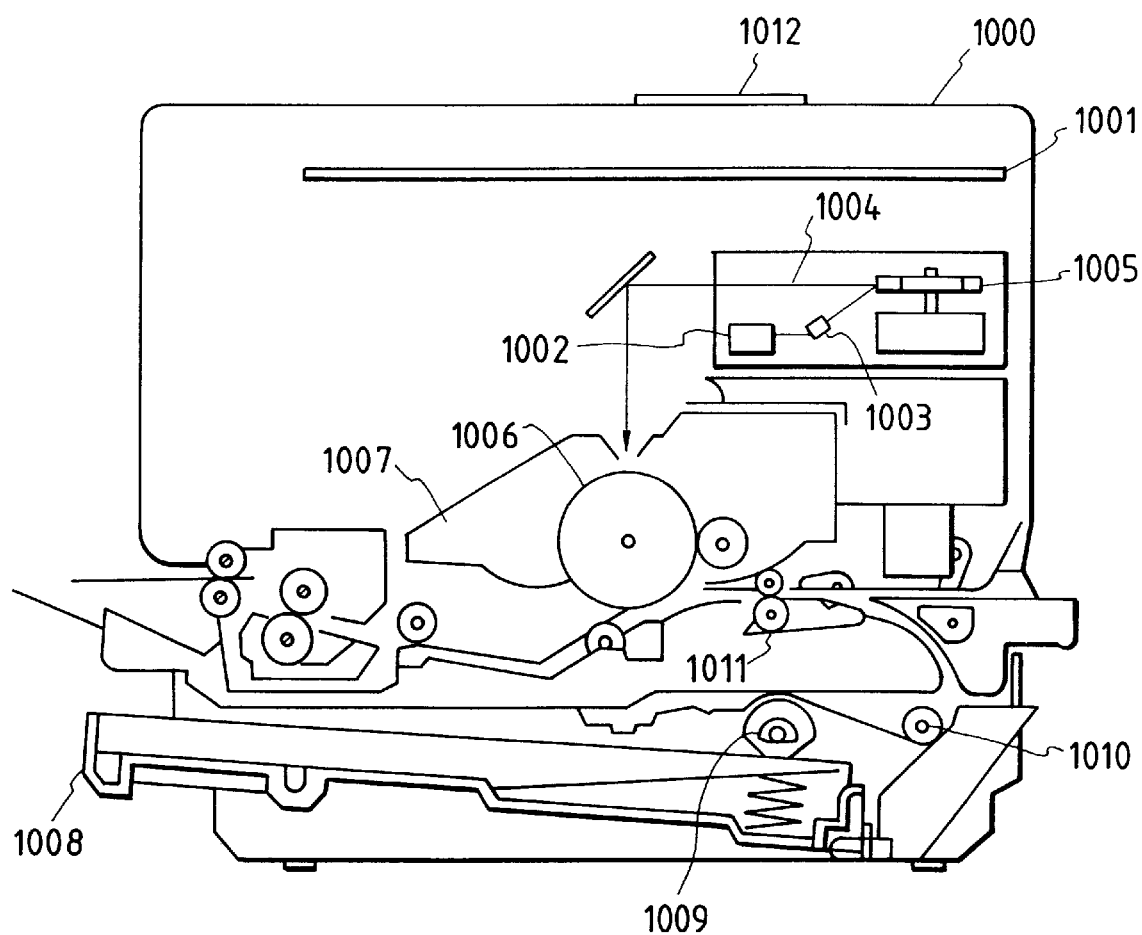
FIG. 1 is a sectional view showing a structure of a laser beam printer taken as an example of an output apparatus to which the present invention is applicable.

FIG. 1 is a sectional view showing a structure of a laser beam printer taken as an example of an output apparatus to which the present invention is applicable. Referring to FIG. 1, a laser beam printer (hereinafter, referred also to as an LBP) 1000 receives and stores information such as print information (e.g., character code), format information or macro instructions sent from a host computer externally connected thereto. Then the LBP 1000 generates a corresponding pattern of a character or format according to the information to form an image onto a recording medium such as printing paper.

An operation unit 1012 is provided with operating switches, LED indicators and such on the LBP 1000. A printer control unit 1001 controls all the operation in the LBP 1000 and analyzes information such as character information sent from the host computer. The printer control unit 1001 mainly serves to convert the character information into a video signal representing a pattern of a corresponding character and output it to a laser driver 1002.

The laser driver 1002 is a circuit for actuating a semiconductor laser 1003 and operative to turn the semiconductor laser 1003 on and off so that emission of a laser beam 1004 can be controlled in accordance with the input video signal. The laser beam 1004 is deflected in a lateral direction by a rotating polygon 1005 to scan and expose an electrostatic drum 1006 so that an electrostatic latent image of the character pattern will be formed on the electrostatic drum 1006.

The latent image is developed by a developing unit 1007 and transferred to a recording medium (e.g., recording paper or OHP sheet).

Cut sheets can be used as the recording paper. Such cut-sheet recording papers are inserted and stored in a paper cassette 1008 attached to the LBP 1000, fed in the apparatus to the electrostatic drum 1006 by carrying rollers 1010 and 1011.

The LBP 1000 is also provided with at least one card slot, not shown, so that option cards and control cards for different languages (emulation cards) can be optionally used in addition to internal fonts.

Figure 2:
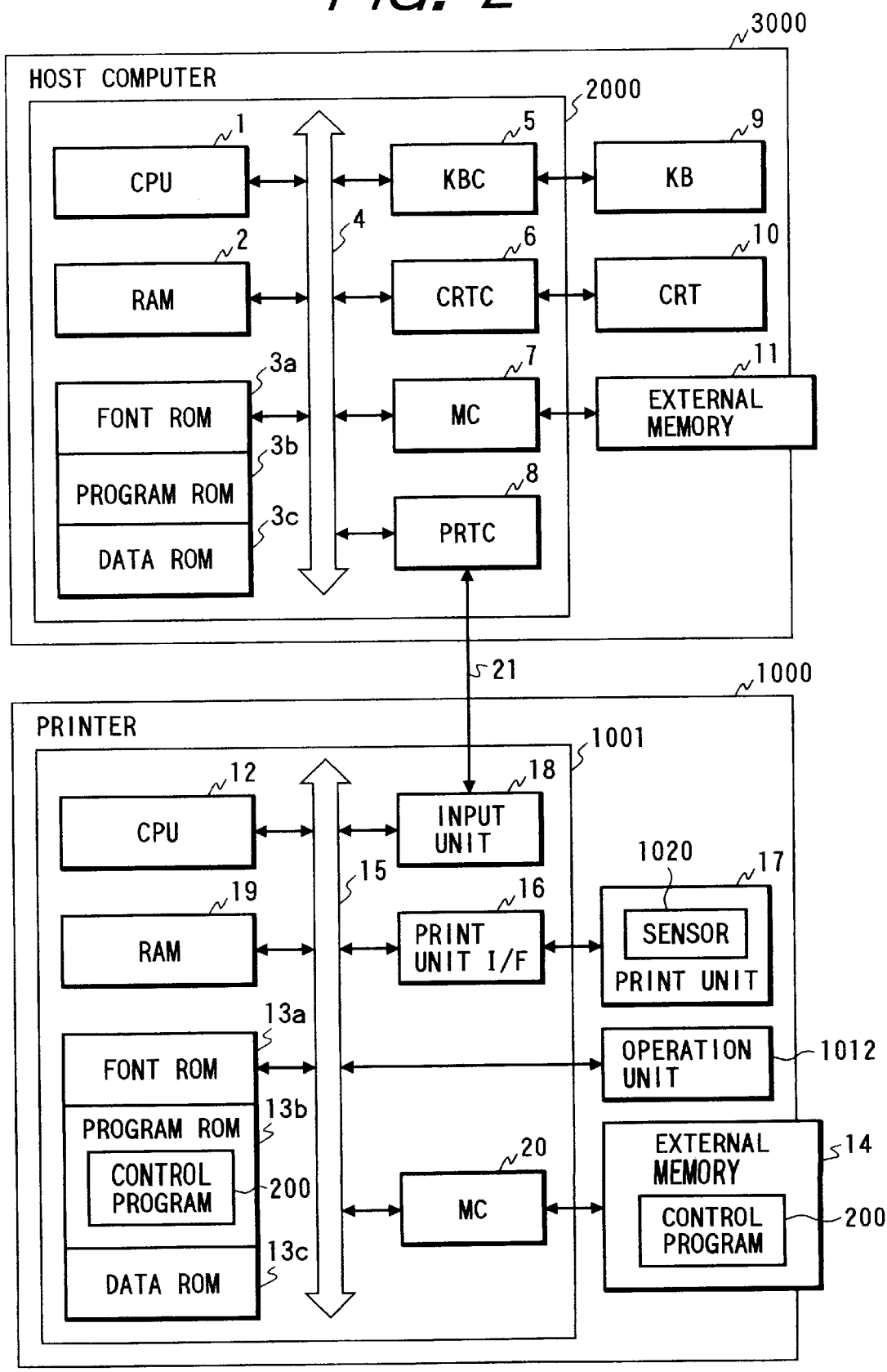
FIG. 2 is a block diagram showing control blocks in a printer system including the laser beam printer.

FIG. 2 is a block diagram showing control blocks in a printer system including the above laser beam printer.

An exemplary structure of the host computer 3000 is first described. Referring to FIG. 2, a CPU 1 generally controls all the devices, connected to a system bus 4, in accordance with programs such as a document processing program memorized in a program ROM 3b and executes document processing to create documents in which various images such as bit map images, characters and graphics (including drawings, paints and graphs) exist together.

The program ROM 3b stores various programs such as a control program for the CPU 1, a font ROM 3a stores font data used in the document processing, and a data ROM 3c stores all data used for execution of various processing such as the document processing. A RAM 2 is a memory such as used as a main memory of the CPU 1 and for a work area.

A keyboard controller (KBC) 5 controls key input from a keyboard 9 or a pointing device, not shown. A CRT controller (CRTC) 6 controls a CRT display (CRT) 10. A memory controller (MC) 7 controls access to an external memory 11 such as a floppy disk (FD) or a hard disk (HD) for memorizing a boot program, various applications, font data, user files and editing files.

A printer controller (PRTC) 8 is connected to the printer 1000 through a two-way interface 21 for control of communication with the printer 1000.

For example, the CPU 1 executes expansion (rasterization) processing to expand or load an outline font into a display information RAM set on the RAM 2 and this enables WYSIWYG on the CRT 10. The CPU 1 also executes various data processings concurrently in various windows opened by designating respective (correspondingly-registered) commands with a mouse cursor.

Next, an exemplary structure of the printer 1000 is described. In the printer 1000, a CPU 12 generally controls all the devices, connected to a system bus 15, in accordance with a control program 200 to generate image signals as output information on the basis of print information, e.g., in accordance with a page description language. The image signals are output to a print unit (printer engine) 17 through a print unit interface 16 under control of the CPU 12.

The CPU 12 is able to recognize status information of the print unit 17 by the print unit interface 16. The status information includes the status of all the parts or elements in the print unit 17, such as "door open" indicating that the door is open, "toner low" indicating the toner becomes low, and "occurrence of an aged change" indicating an aged change occurs.

The control program 200 may be stored in a program ROM 13b, as shown in FIG. 2, or stored in an external memory 14, or supplied from the host computer 3000 (and stored in a RAM 19) or supplied with other storage form. Details of control by the control program 200 will be described later.

A font ROM 13a stores font data such as used for generating the output information, and a data ROM 13c stores information such as used on the host computer 3000.

The CPU 12 is communicable with the host computer 3000 through an input unit 18, for example, it can send information of the printer 1000 to the host computer 3000.

The RAM 19 is a memory such as used as a main memory of the CPU 12 and for a work area, and the capacity of the main memory is extensible by connecting an option RAM or RAMs onto an additional board. The RAM 19 can also be used for an extension area of the output information, environment data storage area, or as an NVRAM.

The external memory 14 can be various forms of memory such as a hard disk (HD), a floppy disk (FD) and an IC card, and access to the external memory 14 is controlled by a memory controller (MC) 20. The external memory 14 may be connected optionally for supplying the CPU 12 with optional information such as font data, an emulation program or format data. Further, a number of external memories 14 may be connected to the printer 1000.

Figure 3:
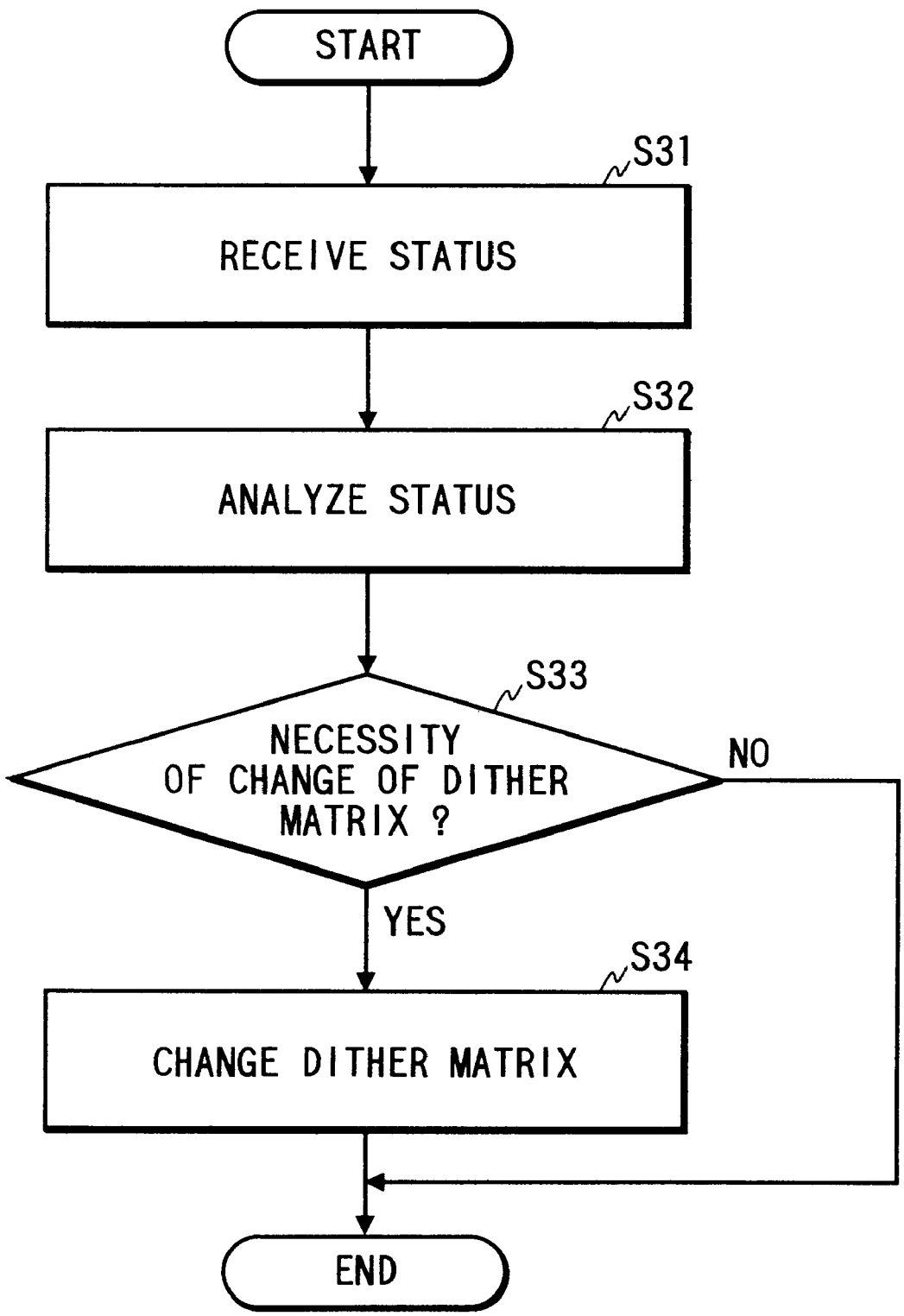
FIG. 3 is a flowchart showing a flow of dither matrix change processing according to a first embodiment of the present invention.

FIG. 3 is a flowchart showing a flow of processing to change a dither matrix (hereinafter, referred to as dither matrix change processing) according to the status of the print unit 17. A program for the dither matrix change processing (i.e., a dither matrix change processing program) is a portion of the control program 200.

The dither matrix is a matrix that uses a dither method for generating output information (a binarized image for pseudo-halftone display) from print information (a multi-valued image) sent from the host computer 3000. As will be discussed below, the embodiment uses such a dither matrix as the pseudo density of the output image (output information) binarized by the dither method becomes 50% of the given density of the multi-valued image in a normal printing state (i.e., when the status of the print unit 17 does not indicate "toner low").

The dither matrix change processing is started, for example, when the print unit interface 16 receives status information indicating that a status change of the print unit 17 occurs. In step S31, the print unit interface 16 receives the status information of the print unit 17 such as "door open", "toner low" or "occurrence of an aged change".

In step S32, the received status information is analyzed and the status of the print unit 17 is recognized. In step S33, determination is made, on the basis of the analysis result, as to whether or not the dither matrix should be changed. When the status of the print unit 17 is "door open", the dither matrix does not need to be changed and the dither matrix change processing is ended. When the status of the print unit 17 is "toner low", if the output information is generated by the dither matrix having a 50% pseudo density, the density of the output image must be too low. It is therefore necessary to change the dither matrix such that the density of the output image becomes 80% of a given density of the output information.

When the toner cartridge is replaced by another one and the print unit 17 returns to the normal status, the dither matrix is changed to the normal one (to be used in the normal printing state) in step S34 after steps S31 to S33.

As discussed above, even if a shortage of toner (toner low) is detected, the density of the output information to be supplied to the print unit 17 will be made higher, so that the density of the output image can be prevented from lowering due to a shortage of toner.

Figure 4:
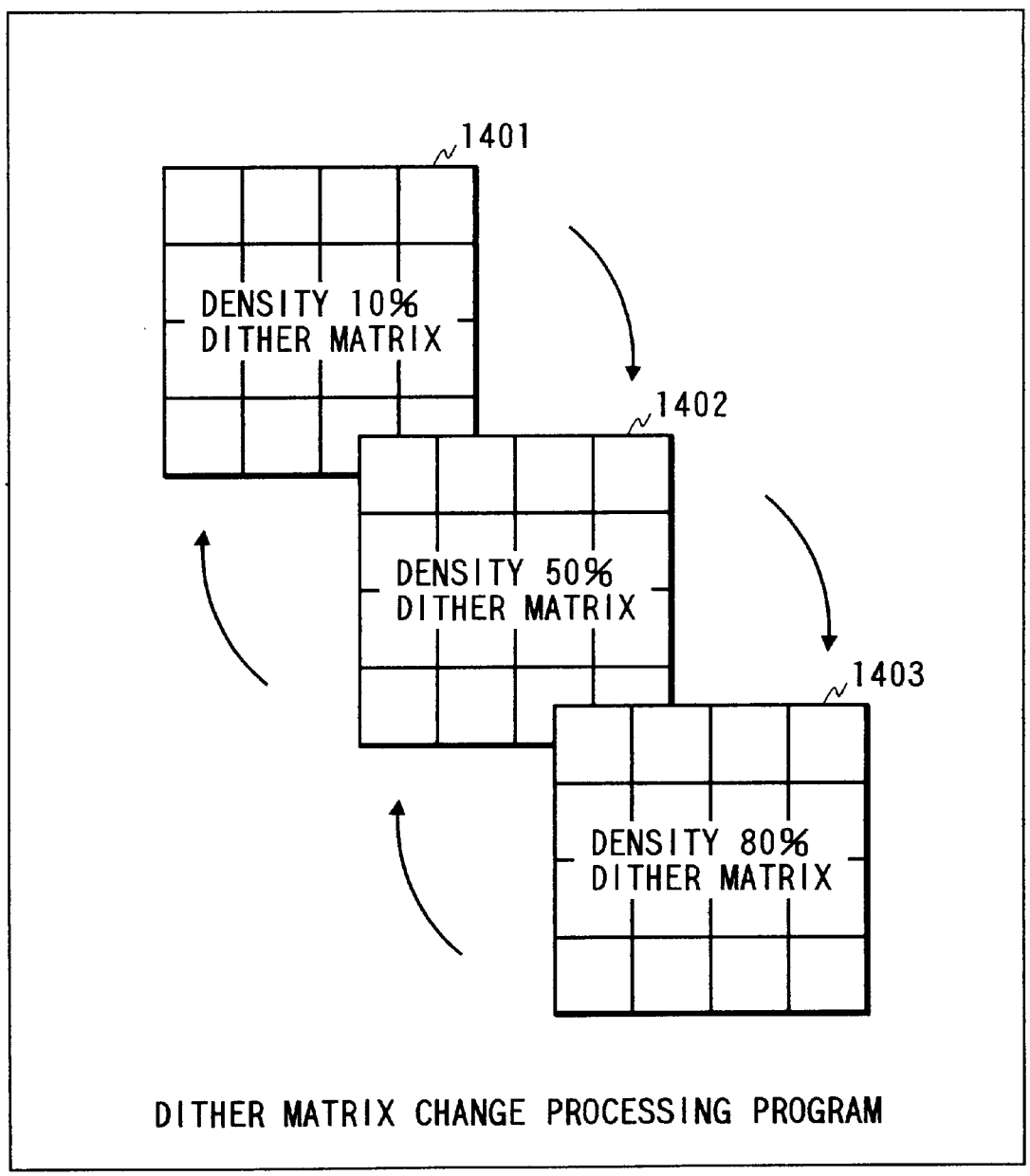
FIG. 4 is a schematic diagram showing changes of the dither matrix according to the dither matrix change processing program.

FIG. 4 is a schematic diagram showing changes of dither matrix according to the dither matrix change processing program. In FIG. 4, a dither matrix 1401 has a 10% pseudo density of the output image (output information) binarized by the dither method from a multi-valued image of a given density, a dither matrix 1402 has a 50% pseudo density of the output image (output information) binarized by the dither method from the multi-valued image of the given density, and a dither matrix 1403 has an 80% pseudo density of the output image (output information) binarized by the dither method from the multi-valued image of the given density. These dither matrices 1401 to 1403 are managed by the dither matrix change processing program.

Although three dither matrices each having a 10%, 50% or 80% pseudo density of the output image are selectable in the embodiment, such density variation is changeable according to the application. Also, the number of selectable matrices is not limited by three (for example, four matrices each having a 20%, 50%, 70% or 90% pseudo density can be selectively used).

Further, the embodiment described processing to change the dither matrix when toner low occurs or the printer recovers from such a state of toner low, but the embodiment is applicable to processing to change the dither matrix according to the aged change, i.e., when receiving "occurrence of an aged change". In this case, a number of dither matrices are prepared for possible degrees of the aged change.

As discussed above, according to the embodiment, the density of the output image can be prevented from lowering due to a shortage of developer.

Further, according to the application example of the embodiment, the dither matrix to be used is changed according to the aged change, so that the output image can be maintained properly.

(Second Embodiment)

A second embodiment of the present invention is to add another processing step to the dither matrix change processing according to the first embodiment. In the second embodiment, the dither matrix to be used is selected on the basis of an analysis result of a parameter sent from the host computer 3000 in addition to the result of the status analysis processing (by step S32 in the first embodiment).

Figure 5:
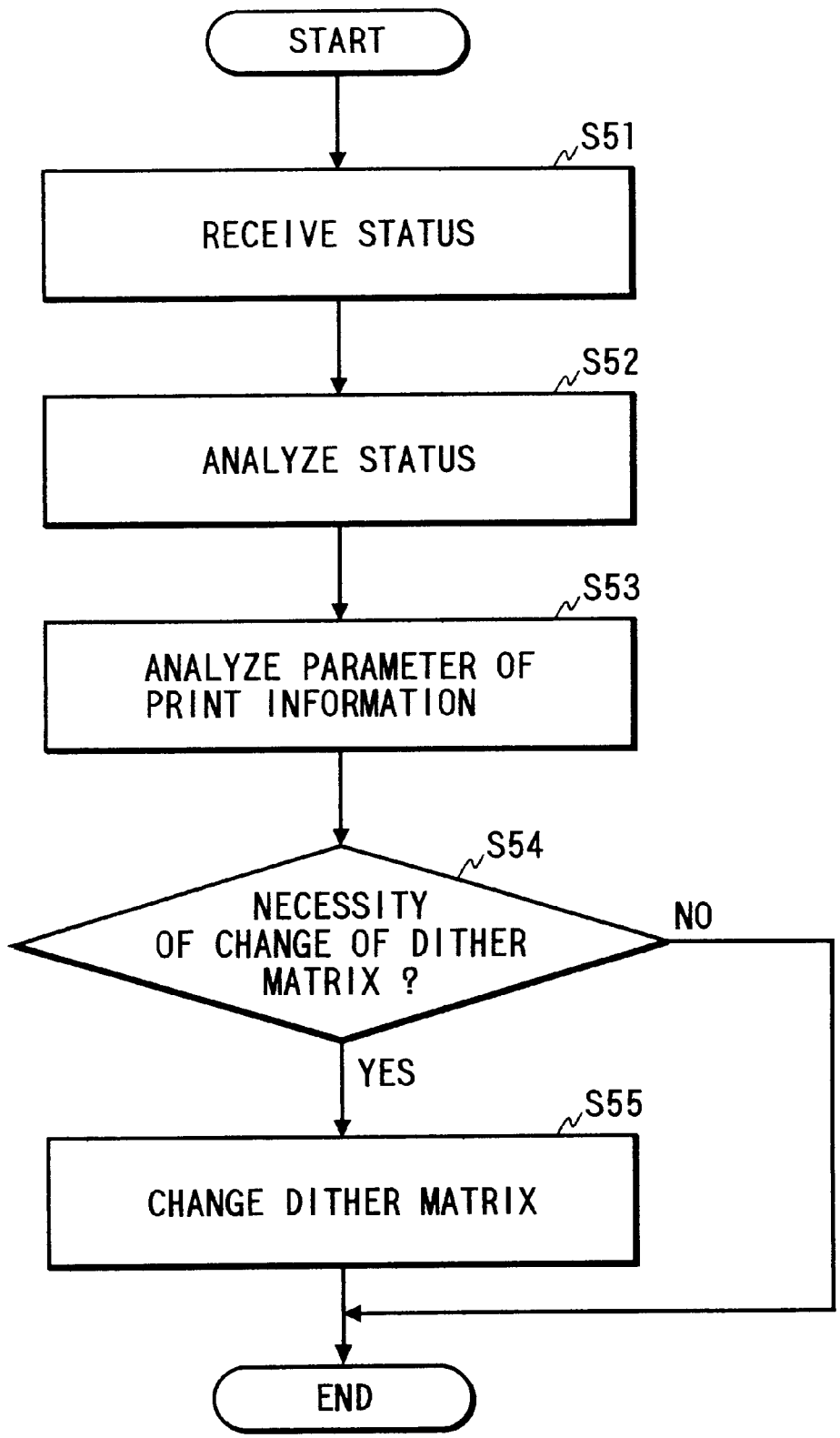
FIG. 5 is a flowchart showing a flow of dither matrix change processing according to a second embodiment of the present invention.

FIG. 5 is a flowchart showing a flow of dither matrix change processing according to the second embodiment. A program for this dither matrix change processing (dither matrix change processing program) is a portion of the control program 200.

In FIG. 5, processing steps S51 and S52 are provided for execution of the same processing as in steps S31 and S32, respectively.

In step S53, a parameter of the print information (descriptive format: for example, a character code for a character, a draw command for a graphic, and a bit map image for a natural picture) sent from the host computer 3000 is analyzed, and determination is made as to whether the image to be output is a character, a graphic or a bit map image (e.g., a natural picture), i.e., the type of image is analyzed. Such an analysis process is preferably performed for each image element when one-page image contains images of various types such as characters, graphics and bit map images. In this case, when the one-page image is expanded on the RAM 19 in accordance with the print information, identification information may be maintained separately, the identification information indicating which image area each pixel of the expanded image belongs to, a character area, a graphic area or a bit map image area. Therefore, the dither matrix has only to be changed according to each image area, i.e., the dither matrix change processing has only to be started when the image area is changed, in the binarization process of the extended image.

In step S54, determination is made, on the basis of the analysis results by steps S52 and S53, as to whether the current dither matrix should be changed. If the change is required, the program advances to step S55 in which an optimum dither matrix is selected.

Next, an application example of the embodiment is shown. Although a proper output image can be obtained with a small number of gradations when the image is a character or a graphic, a bit map image of a natural picture or the like may cause deterioration in its image quality. With a character or a graphic, the smaller the number of gradations, the smaller the dither matrix will be. Therefore, a sharp or clear output image can be obtained with a small number of gradations when the image is a character or a graphic. In contrast, most bit-map image of a natural picture or the like becomes a natural output image as the number of gradations increases. Accordingly, it is preferable to use a dither matrix having a small number of gradations for a character or a graphic, and a dither matrix having a great number of gradations for a bit map image.

It is also preferable to use a plurality of dither matrices with different characteristics as selectable dither matrices. The use of such dither matrices enables a change in characteristic of the output image. FIGS. 6A to 6C show three examples of such dither matrices each consisting of 4×4 pixels (with 16 gradations). These dither matrices may be managed by the dither matrix change processing program.

Figure 7:
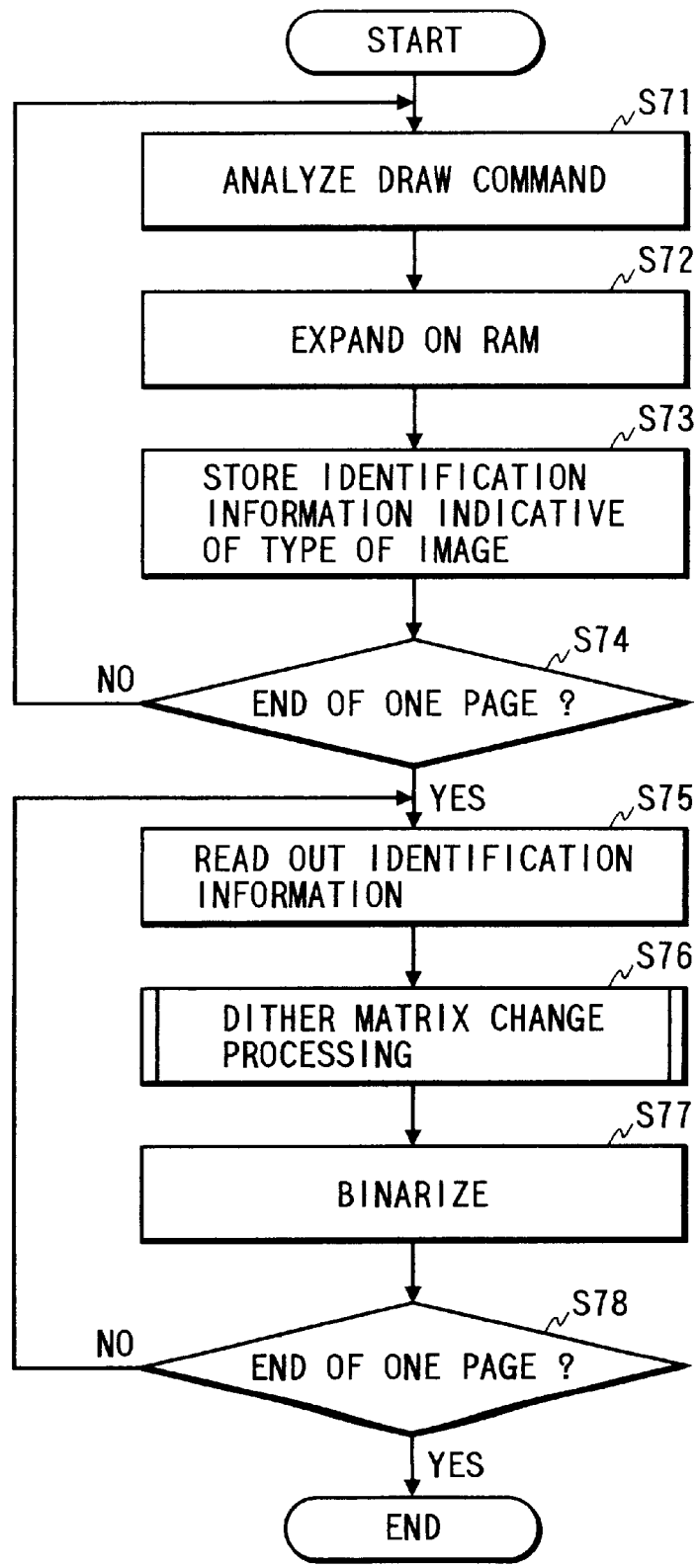
FIG. 7 is a flowchart showing a flow of processing to generate output information on the basis of print information sent from a host computer 3000.

FIG. 7 is a flowchart showing a flow of processing to generate output information (output information generation processing) on the basis of print information sent from the host computer 3000. A program for the output information generation processing (output information generation processing program) is a portion of the control program 200.

Figure 8:
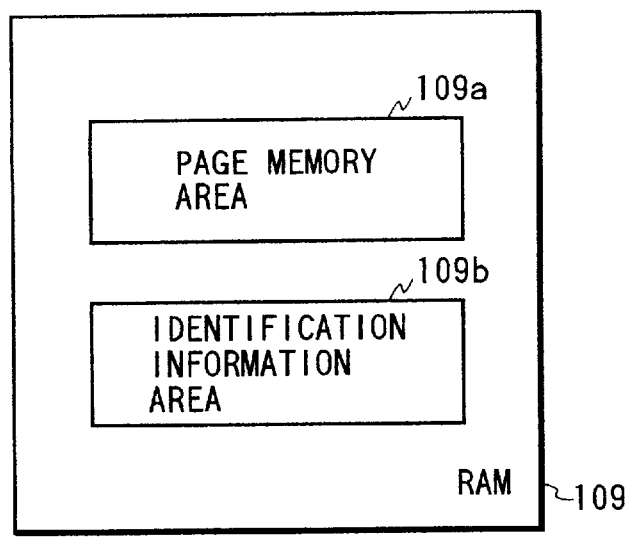
FIG. 8 is a schematic diagram showing an example of a memory map of a RAM 109.

The print information (for example, written in a page description language) sent from the host computer 3000 is analyzed in step S71 and expanded on a page memory area 109a of the RAM 19 (see FIG. 8).

In step S73, identification information indicating whether the image expanded by step S72 on the page memory area 109a is a character, a graphic or a bit map image is stored into an identification information area 109b.

In step S74, determination is made as to whether or not all the print information for one page has been processed. If not completely processed, the program returns to step S71 and a sequence of the processing steps S71 to S74 is repeated.

After repeating the processing steps S71 to S73, if determination is made that all the one-page print information has been processed, the program advances from step S74 to step S75. In step S75, the identification information is read out from the identification information area 109b. Then the dither matrix change processing is executed in step S76. Thus, a proper dither matrix is selected for the draw format of the image such as a character, a graphic or a bit map image.

In step S77, pixel data in an area corresponding to the identification information read out by step S75 is read out, and binarized by using the dither matrix selected by step S76 so that the binarized pixel data will be supplied to the print unit 17 as output information.

In step S78, determination is made as to whether or not all the output information for one page has been generated. If not completely generated, the program returns to step S75.

As discussed above, according to the embodiment, the dither matrix can be selectively changed according to the type of image such as a character, a graphic or a bit map image, i.e., according to the image descriptive format in the print information, thereby obtaining an optimum output image for each descriptive format.

(Third Embodiment)

Figure 9:
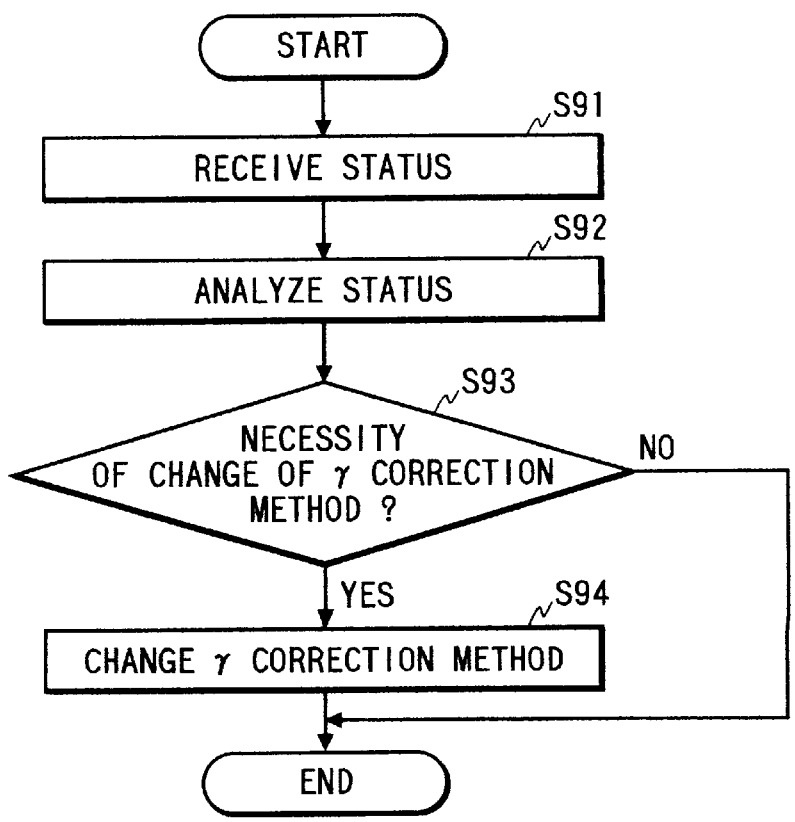
FIG. 9 is a flowchart showing a flow of processing to change a γ correction method (γ correction method change processing) according to status of a print unit 17.

A third embodiment is to change a γ correction method according to the status of the print unit 17. FIG. 9 is a flowchart showing a flow of processing to change the γ correction method (hereinafter, referred to as γ correction method change processing) according to the status of the print unit 17. A program for the γ correction method change processing (γ correction method change processing program) is a portion of the control program 200. The γ correction method change processing according to the third embodiment may be used in combination with the dither matrix change processing according to the first or second embodiment.

Figure 10:
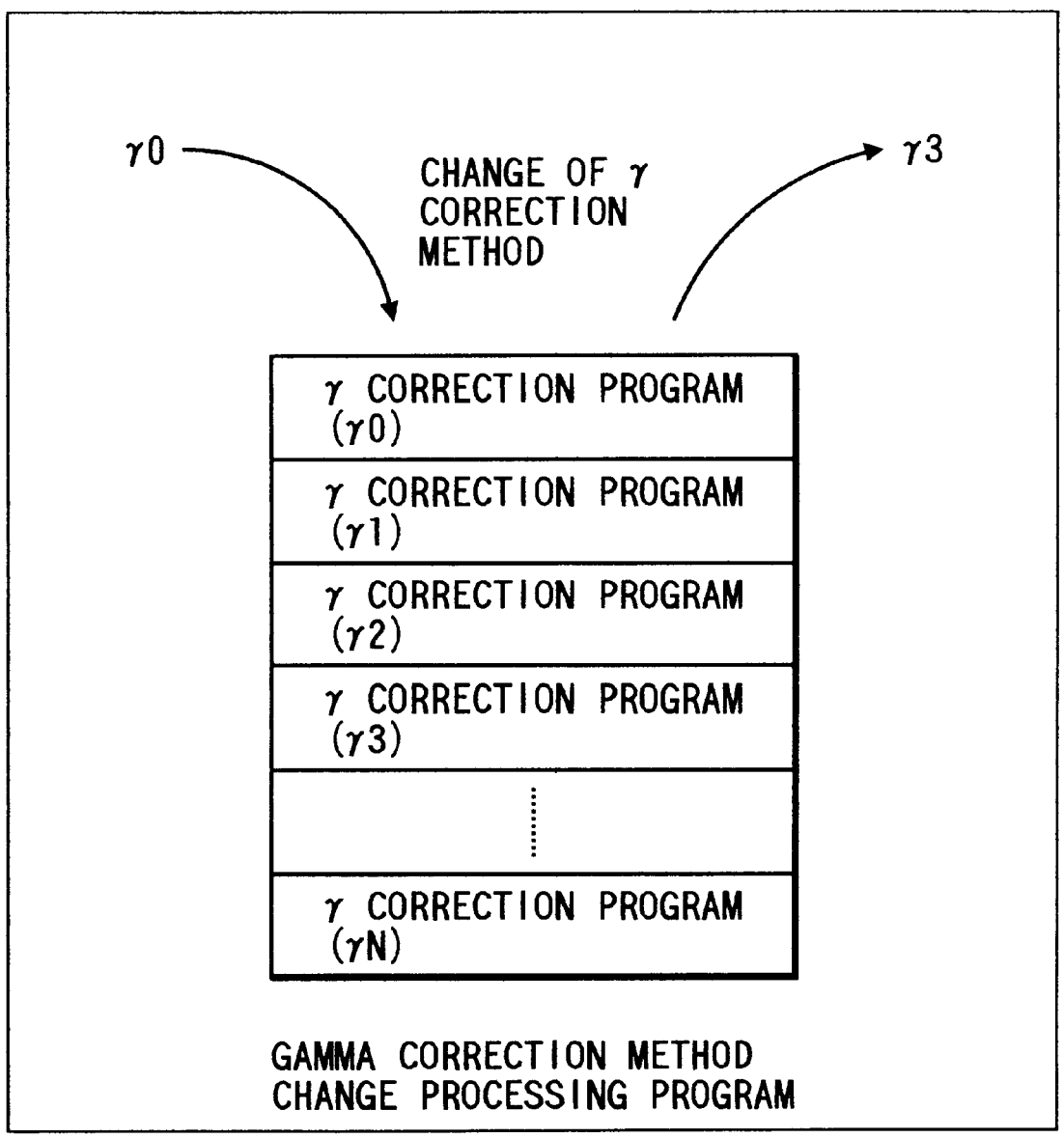
FIG. 10 is a schematic diagram showing a plurality of γ correction programs (γ0–γN) managed by the γ correction method change program.

In the embodiment, the γ correction is made by a selected γ correction method in the generation process of the output information. FIG. 10 is a schematic diagram showing a plurality of γ correction programs (γO to γN) managed by the γ correction method change program. In operation, any one of such γ correction programs (γO to γN), i.e., an optimum γ correction method, is selected by the γ correction method change program in accordance with the status of the print unit 17. It should be noted that such a γ correction may be made at the print unit 17.

In FIG. 9, processing steps S91 and S92 are provided for execution of the same processing as in steps S31 and S32, respectively.

In step S93, determination is made, on the basis of the analysis result by step S92, as to whether or not the γ correction method should be changed. When the status of the print unit 17 indicates "door open", the γ correction method does not need to be changed and the γ correction method change processing is ended. If it is necessary to change the γ correction method, the program advances to step S94 in which any one of γ correction programs (γO to γN) is selected. Thus, an optimum γ correction method is selected.

Changing the γ correction method is effective in the following cases. Firstly, it is effective in maintaining the quality of output image when a change in the status of the print unit 17 to "occurrence of an aged change" is recognized and the γ correction method is changed according to the degree of the aged change. In this case, a number of γ correction programs are prepared for possible degrees of the aged change.

Secondly, it is effective in a case where the γ correction method change processing is used in combination with the dither matrix change processing according to the first or second embodiment. By changing γ characteristics along with a change of the dither matrix, various output characteristics can be obtained.

As discussed above, according to the embodiment, the image quality of output image can be prevented from deteriorating due to an aged change.

(Fourth Embodiment)

A fourth embodiment is to change the dither matrix according to the material of a recording medium to be used. Such material information of the recording medium can be obtained by a sensor 1020 provided before the carrying rollers 1011, or in accordance with instructions from an operating button on the operation unit 1012 or from the host computer 3000.

Figure 11:
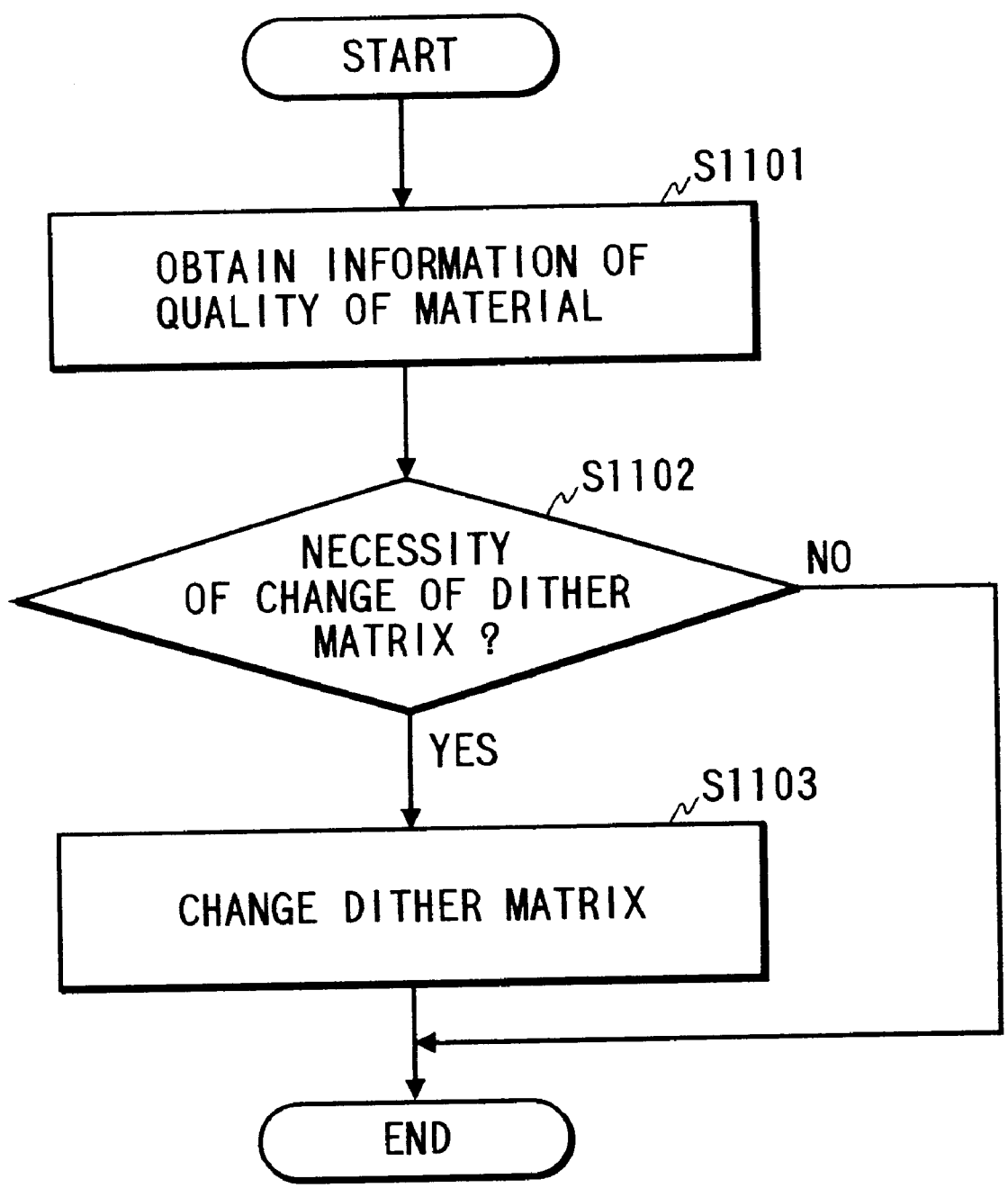
FIG. 11 is a flowchart showing a flow of dither matrix change processing according to a fourth embodiment of the present invention.

FIG. 11 is a flowchart showing a flow of processing to change the dither matrix according to the material of a recording medium to be used. A program for the processing of this flowchart is a portion of the control program 200. The dither matrix change processing according to the fourth embodiment may be used in combination with the dither matrix change processing or the γ correction method change processing according to any one of the first through third embodiments. When the embodiment is used together with the first or second embodiment, the material information of the recording medium has only to be received as status information by step S31 or S51. When it is used together with the third embodiment, the program for executing processing of the flowchart in FIG. 11 has only to be prepared together with the γ correction method change program.

In step S1101, the material information of the recording medium is obtained as previously described. In step S1102, determination is made, on the basis of the obtained material information (e.g., transmittance), as to whether or not the dither matrix should be changed. For example, when an OHP sheet is used in the condition that a dither matrix for recording paper has been selected, the dither matrix needs to be changed. Similarly, when recording paper is used in the condition that a dither matrix for OHP sheet has been selected, the dither matrix needs to be changed. In step S1103, the currently-selected dither matrix is changed to a suitable one according to the material of the recording medium.

Figure 12:
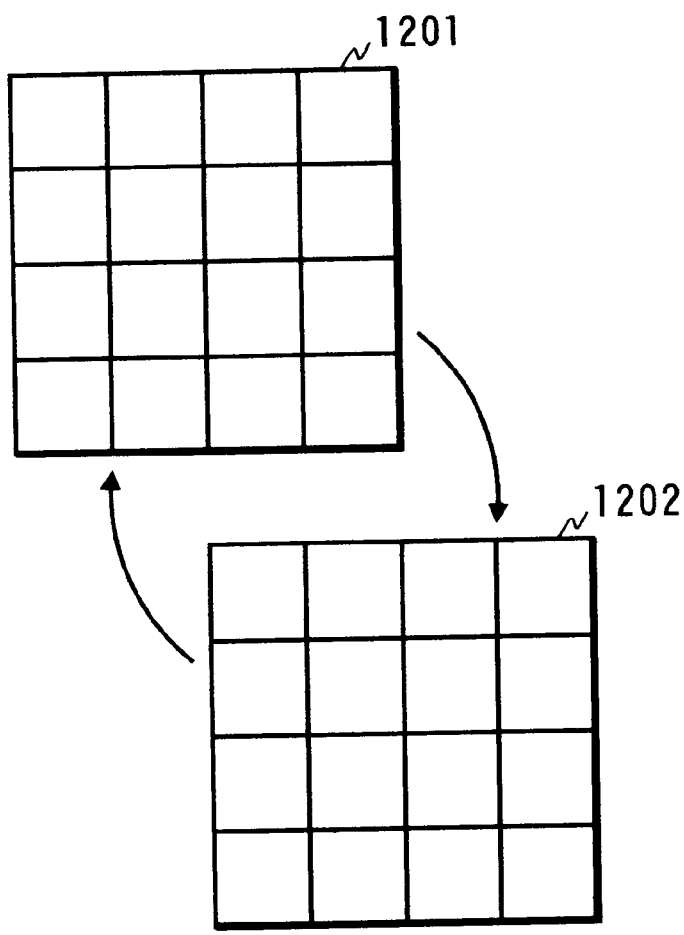
FIG. 12 is a schematic diagram showing a change of dither matrix according to the dither matrix change processing program in the fourth embodiment.

FIG. 12 is a schematic diagram showing a change of dither matrix according to the dither matrix change processing program in the fourth embodiment. In FIG. 12, there are shown a dither matrix 1201 for recording medium and a dither matrix 1202 for OHP sheet. These dither matrices 1201 and 1202 are managed by the dither matrix change processing program.

Although the embodiment is to change the dither matrix according to the material of the recording medium, it is also applicable to the processing to change the γ correction method according to the material of the recording medium.

As discussed above, according to the embodiment, the dither matrix (or the γ correction method) can be changed according to the type of recording medium, so that a proper output image can be obtained for each type of recording medium.

It should be noted that the present invention may be applied to either a system consisting of a plurality of apparatuses such as a host computer, an interface device, a reader and a printer, or an apparatus such as a copy machine or a facsimile.

Further, the present invention may be achieved by using a storage medium supplied to the system or the apparatus, in which software program codes for executing functions of the above embodiments are stored in the storage medium and read out by a computer (CPU or MPU) in the system or the apparatus for execution of the processings according to the above embodiments.

In this case, since the program codes themselves perform the functions of the above embodiments, the storage medium for storing the program codes constitutes the present invention.

Various types of storage medium can be used as the storage medium for storing the program codes, such as a floppy disk, a hard disk, an optical disk, a magneto-optical disk, a CD-ROM, a CD-R, a magnetic tape, a nonvolatile memory card, or a ROM.

Although the functions of the above embodiments are performed by the computer reading out and executing the program codes, they may be performed through an OS (operating system) running on the computer, in which the OS executes a part or all of actual processings in accordance with instructions of the program codes.

Further, the program codes may be written into a memory in a function extended unit connected to the computer or a function extended board inserted into the computer. In this case, the functions of the above embodiments are performed by a CPU mounted on the function extended board or in the function extended unit, in which the CPU executes a part or all of the actual processings in accordance with instructions of the program codes.

As described above, according to the first through fourth embodiments, the rule of image processing can be changed properly on the basis of information related to image output conditions to obtain a proper output image.

(Fifth Embodiment)

Figure 13:
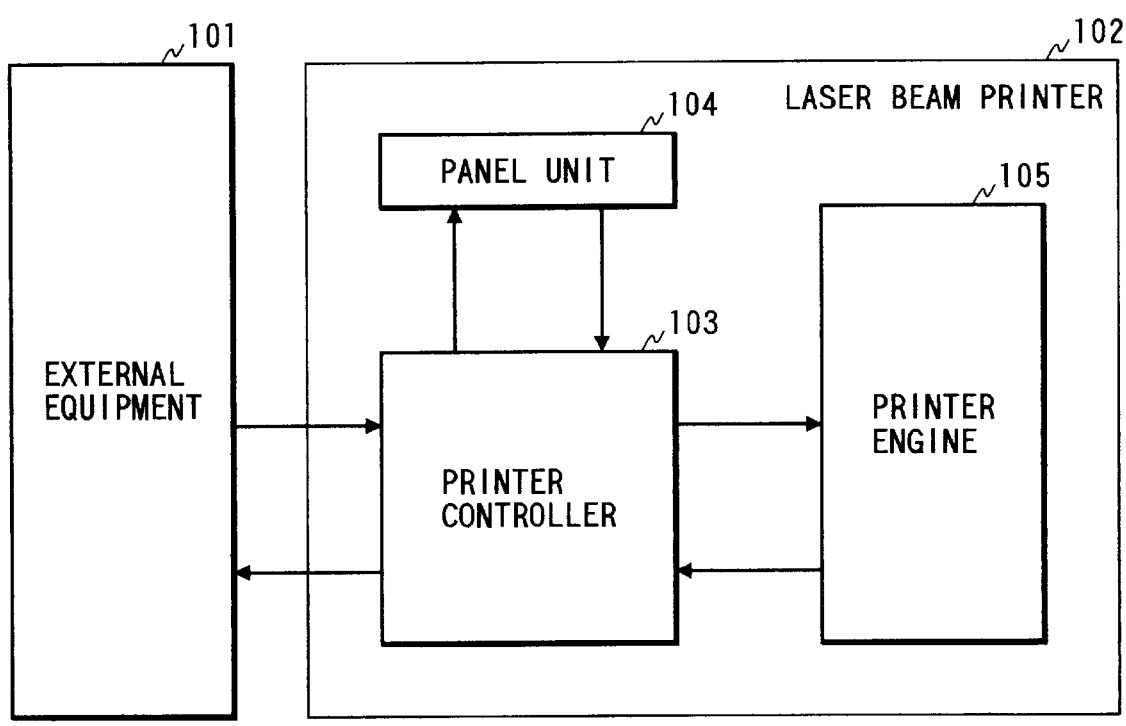
FIG. 13 is a block diagram showing a structure of a laser beam printer taken as an example of a printer according to a fifth embodiment of the present invention.
Figure 14:
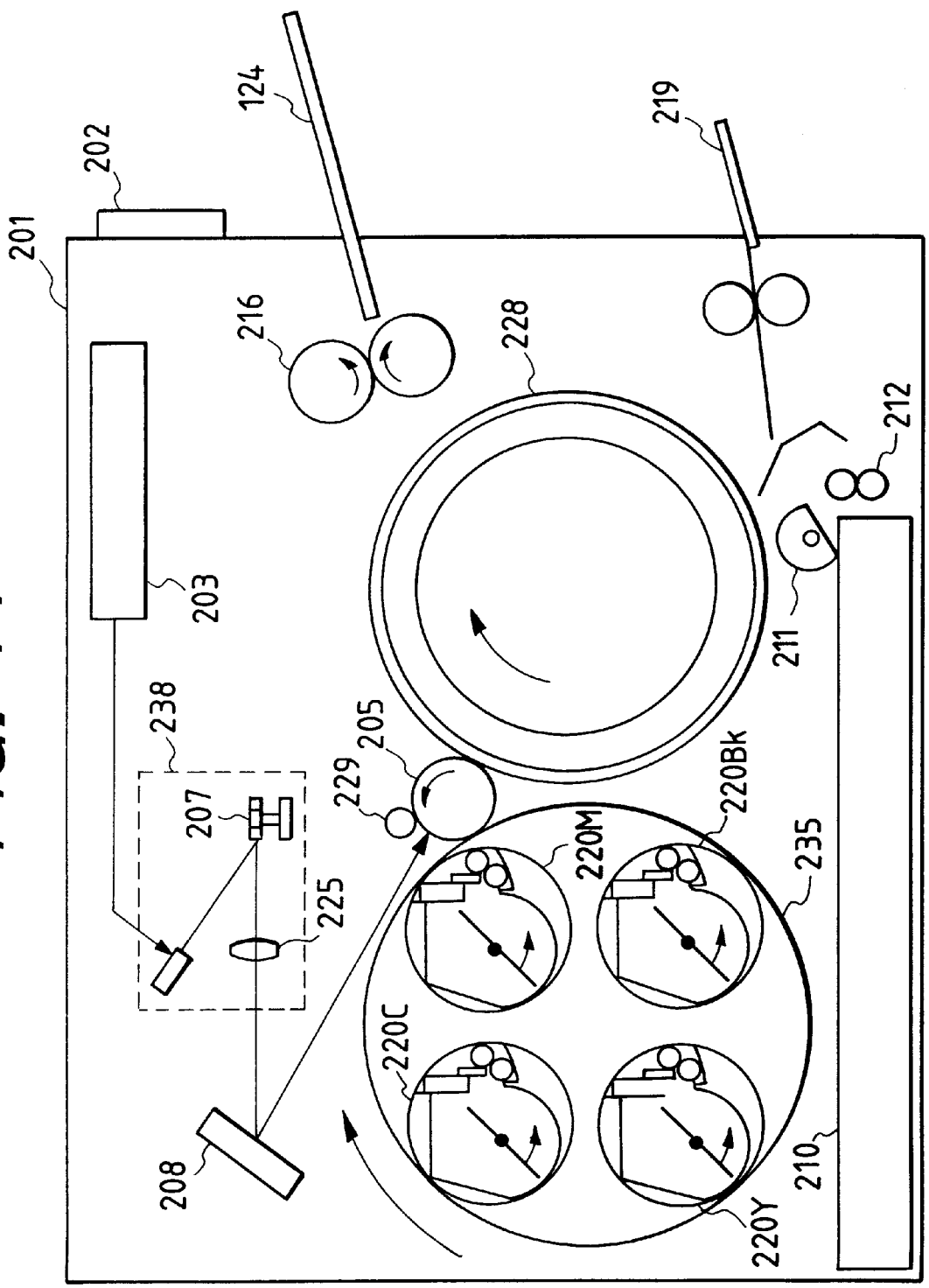
FIG. 14 is a schematic diagram showing a mechanism of the laser beam printer of FIG. 13.
Figure 15:
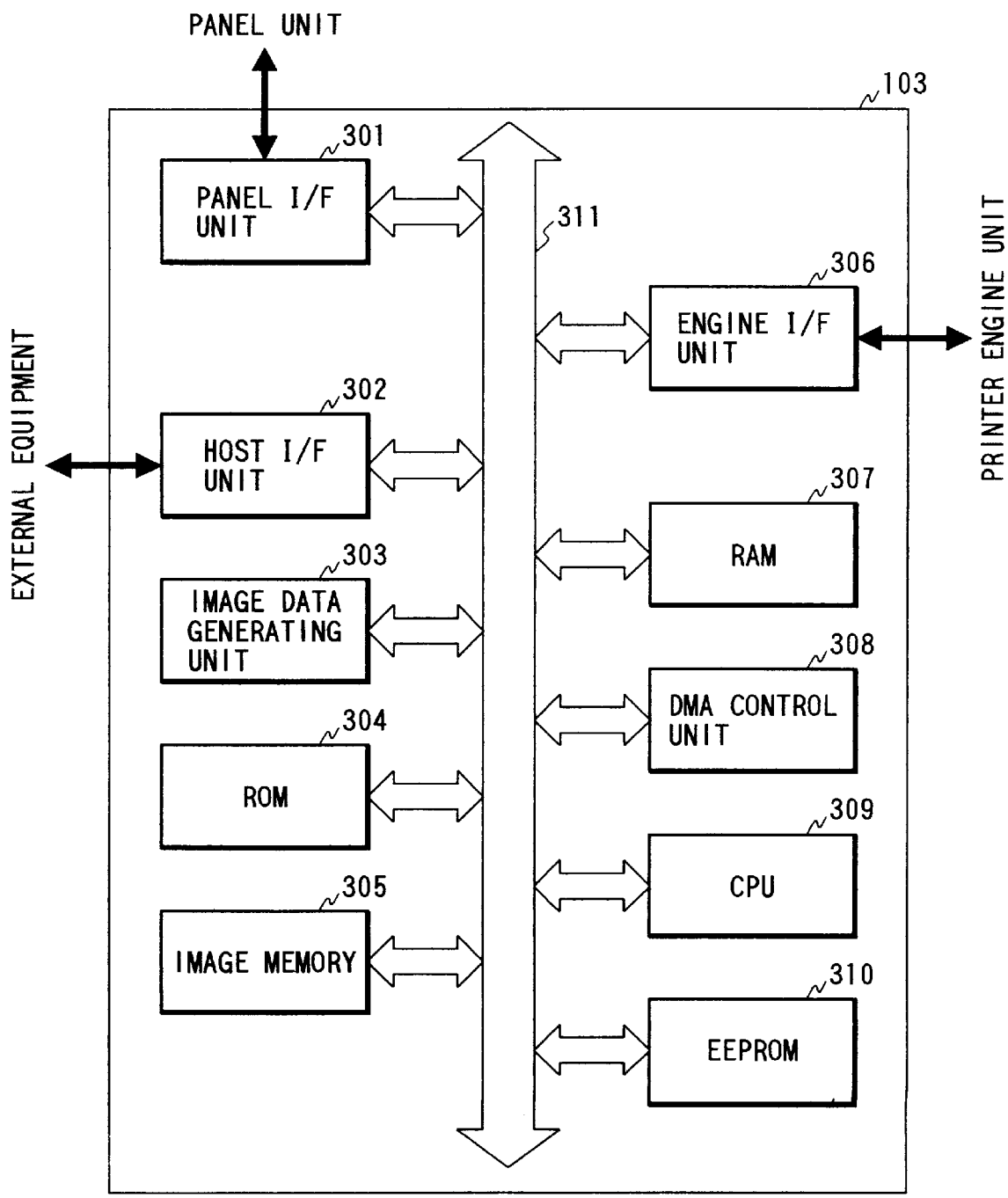
FIG. 15 is a block diagram showing a structure of a printer controller mounted in the laser beam printer of FIG. 13.
Figure 16:
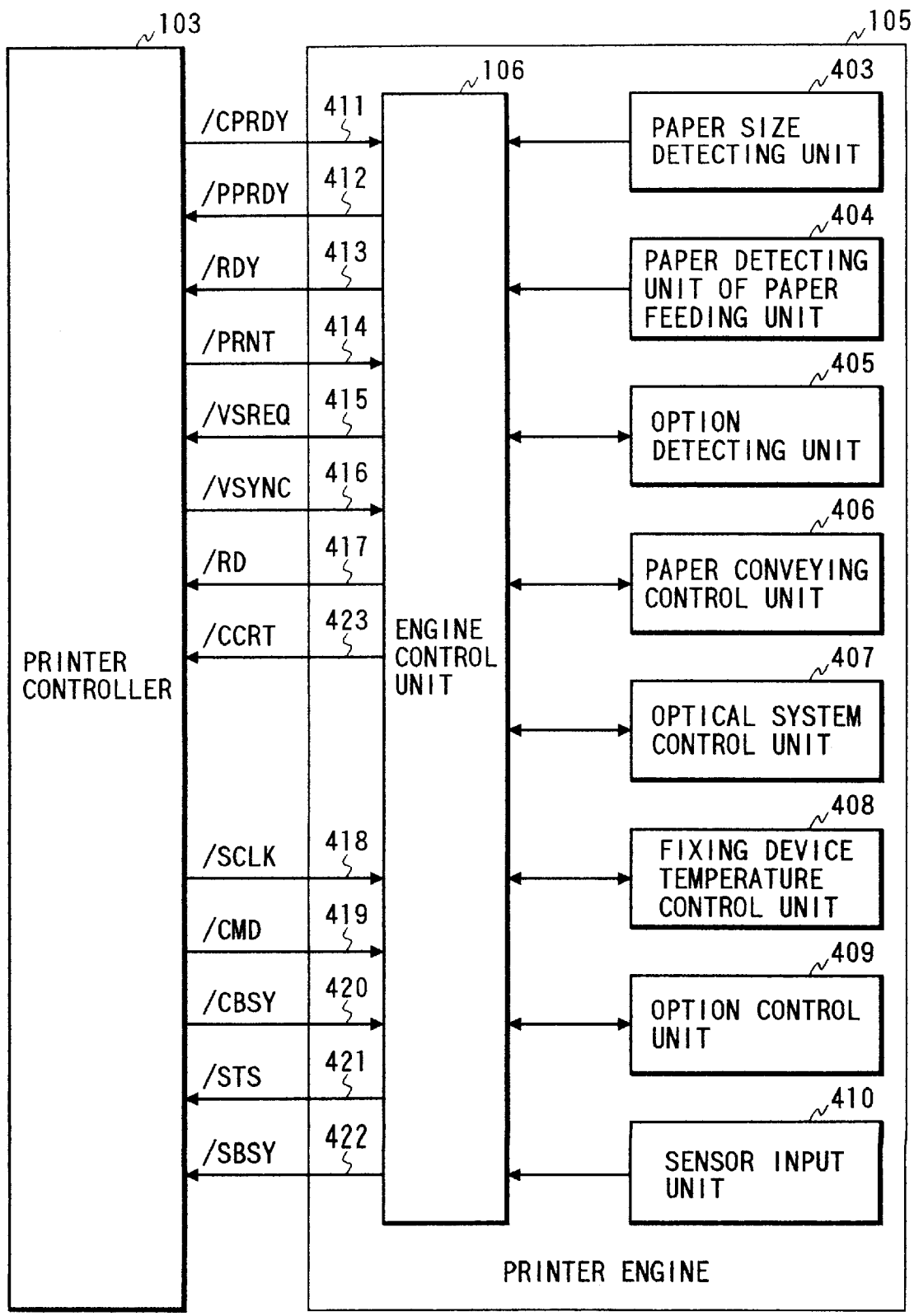
FIG. 16 is a block diagram showing signals exchanged between the printer controller and a printer engine in the laser beam printer of FIG. 13.

FIG. 13 is a block diagram showing a structure of a laser beam printer taken as an example of a printer according to a fifth embodiment of the present invention; FIG. 14 is a schematic diagram showing a mechanism of the laser beam printer of FIG. 13; FIG. 15 is a block diagram showing a structure of a printer controller mounted in the laser beam printer of FIG. 13; and FIG. 16 is a block diagram showing signals exchanged between the printer controller and a printer engine in the laser beam printer of FIG. 13.

As shown in FIG. 13, a laser beam printer 102 capable of printing out color images receives information (hereinafter, referred to as print data) from external equipment such as a host computer 101, the print data containing color multi-valued information written in a given page description language. The laser beam printer 102 is constituted of a printer controller 103 for analyzing the print data to generate image data, a printer engine (hereinafter, simply referred to an engine) 105 for printing onto paper an image of the image data generated by the printer controller 103, and a panel unit 104 that provides a user interface so that the user can input desired instructions to the laser beam printer 102.

Referring next to FIG. 14, mechanisms of the laser beam printer according to the embodiment will be described.

As shown in FIG. 14, the laser beam printer 102 has a cabinet 201, and all the mechanisms constituting the engine 105, an engine control unit 106 (see FIG. 16) for controlling all the print processing (e.g., paper feed processing) performed by the mechanisms of the engine 105, and a control board storage 203 for storing the printer controller (see FIG. 13) are built in the cabinet 201.

The mechanisms constituting the engine 105 include an optical processing mechanism for forming an electrostatic latent image on a photoconductive drum through a scanning laser beam, developing the electrostatic latent image into toner images with toner colors and transferring the toner images onto printing paper; a fixing processing mechanism for fixing the toner image transferred onto the printing paper; a paper feed processing mechanism for feeding the printing paper; and a paper conveyance processing mechanism for conveying the printing paper.

In the apparatus body 201, there are provided an image carrier or photoconductive drum 205; a roller charger 229; a plurality of developing devices 220M, 220C, 220Y and 220Bk. The developing devices 220M, 220C, 220Y and 220Bk, located at the left side of the photoconductive drum 205, are arranged in a concentric circle about a rotation axis, and filled with magenta toner, cyan toner, yellow toner and black toner, respectively. Each of the developing devices is driven such that its effective area for development always faces the photoconductive drum 205.

Further, a transfer drum 228 is provided at the right side of the photoconductive drum 205, which transfers an image of the photoconductive drum 205 onto recording paper (not shown) while holding the recording paper. The photoconductive drum 205 is driven to rotate in a direction indicated by the arrow in FIG. 14.

In the roller charger 229, an AC voltage having a Vpp (peak-to-peak) of 1500 V and a frequency of 1000 Hz is superimposed on a DC voltage of about −700 V, so that the surface of the photoconductive drum 205 is uniformly charged to about −700 V.

In the upper portion of the apparatus body, there is provided an optical scan system consisting of exposure equipment or a laser diode 206, a rotating polygon 207 driven to rotate by a high-speed motor, an optical unit 238 including an imaging lens 225, and a reflector mirror 208.

The optical processing mechanism includes a laser driver for turning the semiconductor laser 206 on and off so that a laser beam emitted from the semiconductor laser 206 can be controlled in accordance with the image data sent from the printer controller 103. The laser beam emitted from the semiconductor laser 206 is deflected in a horizontal scanning direction by the rotating polygon 207. The deflected laser beam is led to the photoconductive drum 205 through the reflector 208 to expose the photoconductive drum 205 in the horizontal scanning direction.

Thus an electrostatic latent image is formed on the photoconductive drum 205 by using the laser beam to scan and expose the photoconductive drum 205. The latent image is developed into toner images with toner colors supplied from the developing devices 220Y, 220C, 220M and 220Bk, respectively.

As mentioned above, toner colors used here are Y (yellow), M (magenta), C (cyan) and Bk (black). The toner images on the photoconductive drum 205 are sequentially transferred to and overlapped on the printing paper wound on the transfer drum 228.

In the exposure process, a beam detector (not shown) detects the laser beam and the detection signal is sent to the printer controller 103. The printer controller 103 determines exposure timing to move the laser beam in the horizontal scanning direction on the basis of the detection signal from the beam detector.

The fixing processing mechanism includes a fixing device 216 for fixing the toner images on the printing paper by heating pressure. The fixing device is provided with a heater for heating the toner images. The heater is adjusted to a given fixing temperature under control of the engine control unit 106.

The paper feed mechanism includes a cassette 210 for storing sheets of printing paper and a hand feeder tray 219 so that printing paper can be selectively fed from the cassette 210 or the hand feeder tray 219.

The cassette 210 is provided with a size detection mechanism for electrically detecting the size of currently-set printing paper from the position of a partition plate (not shown). In operation, the cassette 210 is attached into the cabinet 201, and sheets of printing paper are carried to paper feeding rollers 212 one by one from the topmost sheet by driving a cassette paper-feeding clutch 211 to rotate. The cassette paper-feeding clutch 211 is a cam driven by a drive means (not shown) to rotate intermittently sheet by sheet so that a sheet of printing paper will be fed each time the cam makes a turn.

An operation panel 202 corresponding to the panel unit 104 is mounted on the cabinet 201, including a switch group for input of instructions, an LED display for displaying information, and LCD indicators.

Referring next to FIG. 15, a structure of the printer controller 103 will be described.

The printer controller 103 has a host I/F unit 302 provided with an input buffer (not shown) for input of print data sent from the external equipment 101 and an output buffer (not shown) for temporarily holding signals to be sent to the external equipment 101. The host I/F unit 302 is a unit serving to input and output signals to and from the external equipment 101. The host I/F unit 302 also serves to control communication with the external equipment 101.

Print data input to the printer controller 103 through the host I/F unit 302 is sent to an image data generating unit 303. The image data generating unit 303 analyzes the print data according to a predetermined analysis procedure (e.g., PDL analysis processing) to generate image data that can be processed by the printer engine 105. Specifically, the image data generating unit 303 executes rasterization processing and pseudo-gradation processing in order in parallel with the processing to analyze the print data and generate object information according to the analysis result. The rasterization processing of the print data includes conversion of display colors RGB (additive mixture of colors) to colors YMCK (subtractive mixture of colors) that can be processed by the printer engine, conversion of a character code to font data previously stored such as a bit pattern or an outline font, and generation of bit map data for each band. The bit map data for each band is subject to the pseudo-gradation processing to apply a dither pattern to the bit map image so that printable image data will be generated.

The image data generated such above is stored into an image memory 305. The image data is read out from the image memory 305 under control of a DMA control unit 308 in accordance with instructions from a CPU 309.

The image data read out from the image memory 305 is transferred as a video signal to the engine 105 through an engine I/F unit 306. The engine I/F unit 306 is provided with an output buffer (not shown) for temporarily holding the video signal to be transferred to the engine 105 and an input buffer (not shown) for temporarily holding a signal sent from the engine 105. The engine I/F unit 306 is a unit serving to input and output signals to and from the engine 105. The engine I/F unit 306 also serves to control communication with the engine 105.

Instructions on mode setting or the like are input from the panel unit 104 (see FIG. 13) to the printer controller 103 through a panel I/F unit 301 that provides interface between the panel unit 104 and the CPU 309.

The CPU 309 controls all the above unit or blocks in accordance with the mode designated through the panel unit 104. Such control is carried out according to a control program stored in a ROM 304. The control program stored in the ROM 304 consists of an OS (operating system) for executing time-sharing control in each load module or task in response to a system clock, and a plurality of load modules to be executed in each functional unit under control of the OS. The control program including the load modules may be stored in an EEPROM 310 (nonvolatile memory) if necessary. Then a RAM 307 is used as a work area for computing process of the CPU 309.

All the blocks including the CPU 309 are connected to a system bus 311 so that the CPU 309 can access to the other blocks. The system bus 311 consists of an address bus and a system bus.

Referring next to FIG. 16, signals exchanged between the printer controller and the engine in the laser beam printer will be described.

The engine 105 prints out image data corresponding to the video signal sent from the printer controller 103 in accordance with control instructions from the printer controller 103. All the processing to be performed in this printing process is controlled by the engine control unit 106.

Control processing by the engine control unit 106 in the engine 105 includes paper feeding control processing of printing paper; paper conveying control processing of the printing paper; control processing in an optical system, including control processing to drive a scanner motor and laser light used for forming an electrostatic latent image onto a photoconductive drum; temperature control of a fixing device for fixing a toner image transferred onto the printing paper; and other control processing in the fixing device including temperature abnormality detection.

In the paper feeding control processing of the printing paper, the type and the size of feedable printing paper, and the presence or absence of such feedable printing paper are detected on the basis of detection signals from a paper size detecting unit 403, a paper detecting unit 404 of a paper feeding unit, and an option detecting unit 405, respectively. Then a cassette or an option control unit 409 is instructed to feed printing paper of the designated type and size.

The paper size detecting unit 403 detects the size of the printing paper within a paper cassette currently set to output a detection signal indicative of the detection result. The paper detecting unit 404 of the paper feeding unit detects the presence or absence of respective paper feeding ports of the cassette, a hand feeder, an option cassette, and an envelop feeder, to output detection signals indicative of the detection results. The option detecting unit 405 detects the connecting status of options of the option cassette and the envelop feeder to output detection signals indicative of the detection results. The option control unit 409 instructs the options of the option cassette and the envelop feeder to operate in accordance with control instructions from the engine control unit 106.

In the paper conveying control processing of the printing paper, control instructions are issued to a paper conveying control unit 406 to convey the printing paper along a required conveying path on the basis of detection signals from a sensor input unit 410 that detects the presence or absence of the printing paper within conveying paths for registration, paper ejection, both-side printing and reversed printing. The paper conveying control unit 406 instructs conveying motors to drive conveying rollers, arranged in the respective conveying paths, in accordance with the control instructions from the engine control unit 106.

In the optical system control processing, status signals indicative of the status of the optical system are taken in from an optical system control unit 407, and control instructions to the optical system control unit 407 are generated on the basis of the status signals. The optical system control unit 407 instructs drivers for a scanner motor and a laser to operate in accordance with the control instructions from the engine control unit 106.

In the fixing device control processing, a status signal is taken in from a fixing device temperature control unit 408, the temperature of the fixing device is monitored on the basis of the status signal, and a control instruction is issued to the fixing device temperature control unit 408 to control a heater of the fixing device to be a fixing temperature within a predetermined range. When detecting occurrence of abnormality such as temperature abnormality due to a trouble in the heater of the fixing device, a control instruction is generated to stop operation of the fixing device. The fixing device temperature control unit 408 instructs the source of trouble such as the heater of the fixing device to operate in accordance with the control instruction from the engine control unit 106.

The engine control unit 106 executes all the control processing on the basis of signals exchanged with the printer controller 103. Such signals includes those denoted in FIG. 16 as /CPRDY411, /PPRDY412, /RDY413, /PRNT414, /VSREQ415, /VSYNC416, /BD417, /SCLK418, /CMD419, /CBSY420, /STS421, /SBSY422 and /CCRT423 (Condition Change ReporT).

The signal /CPRDY411 indicates that the printer controller 103 is in a communicable state to the engine control unit 106. The signal /PPRDY412 indicates that the engine control unit 106 is in a standby state in which the engine control unit 106 is communicable with the printer controller 103.

The signal /RDY413 is a signal indicating whether or not the engine control unit 106 is in a standby state in which the engine control unit 106 maintains a printable state. This signal is set to "TRUE" when the status of all the processing in the printing process satisfies preset conditions, or to "FALSE" when the status of all the processing in the printing process does not satisfy the preset conditions, i.e., when the engine control unit 106 is in an abnormal state in which the printing process can not be executed normally.

The signal /PRNT414 indicates that the printer controller 103 requests the engine control unit 106 to start printing. The signal /VSREQ415 indicates that the engine control unit 106 requests the printer controller 103 to generate a vertical synchronizing signal. The signal /VSYNC416 is the vertical synchronizing signal that is output from the printer controller 103 to the engine control unit 106 in response to the signal /VSREQ415. The signal /BD417 is a horizontal synchronizing signal that is output from the printer controller 103 to the engine control unit 106. The signal /SCLK418 is a synchronizing clock signal for synchronizing serial communication between the printer controller 103 and the engine control unit 106.

The signal /CMD419 is a command signal sent from the printer controller 103 to the engine control unit 106. The signal /CBSY420 is a strobe signal for outputting the signal /CMD419. The signal /STS421 is a signal output in response to the signal /CMD419, indicating the internal status of the printer engine 105. The signal /SBSY422 is a signal for outputting the signal /STS421.

The signal /CCRT423 is a signal to be sent from the engine control unit 106 to the printer controller 103 for reporting the presence or absence of a status change in a processing that does not directly concern the signal /RDY413. When a status change in a processing that does not directly concern the signal /RDY413 is detected, the signal /CCRT423 is set to "TRUE". In this case, determination is made, on the basis of the previous and current detection results, as to whether a status change in a processing that does not directly concern the signal /RDY413 is present or absent, and the signal /CCRT423 is generated according to the result of the determination.

Figure 17:
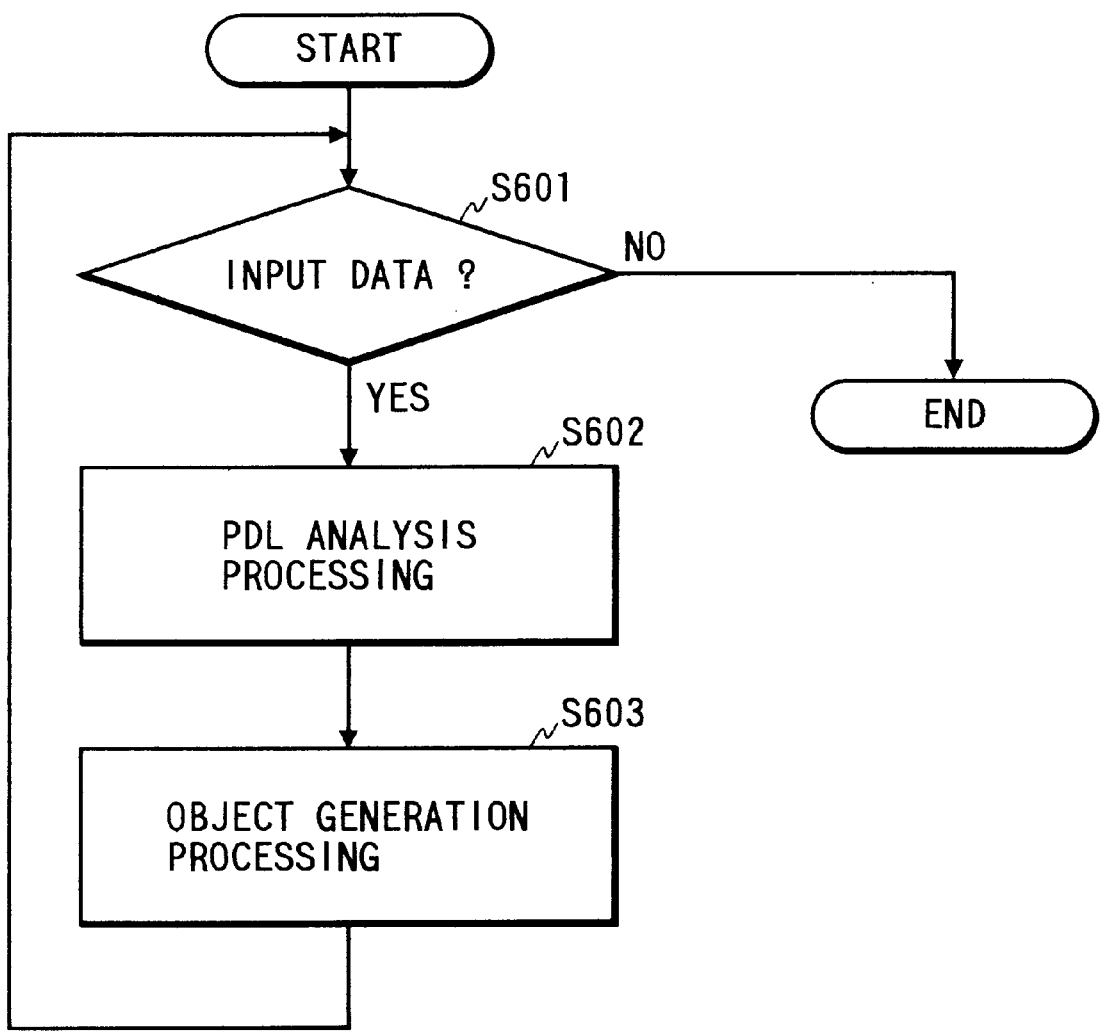
FIG. 17 is a flowchart showing a procedure of page object generation executed by the printer controller in the laser beam printer of FIG. 13.
Figure 18:
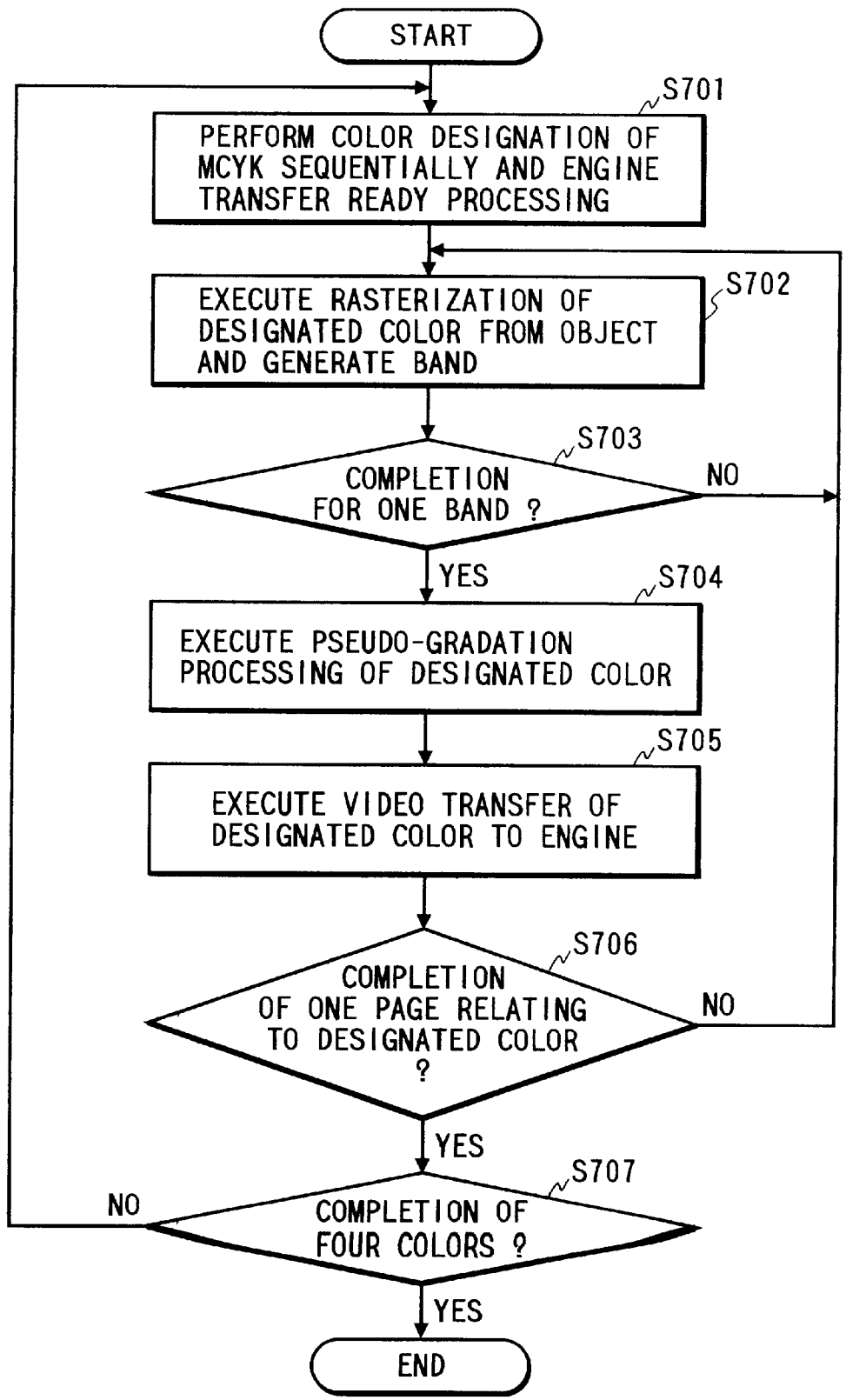
FIG. 18 is a flowchart showing a procedure of video signal generation and transfer executed by the printer controller in the laser beam printer of FIG. 13.
Figure 19:
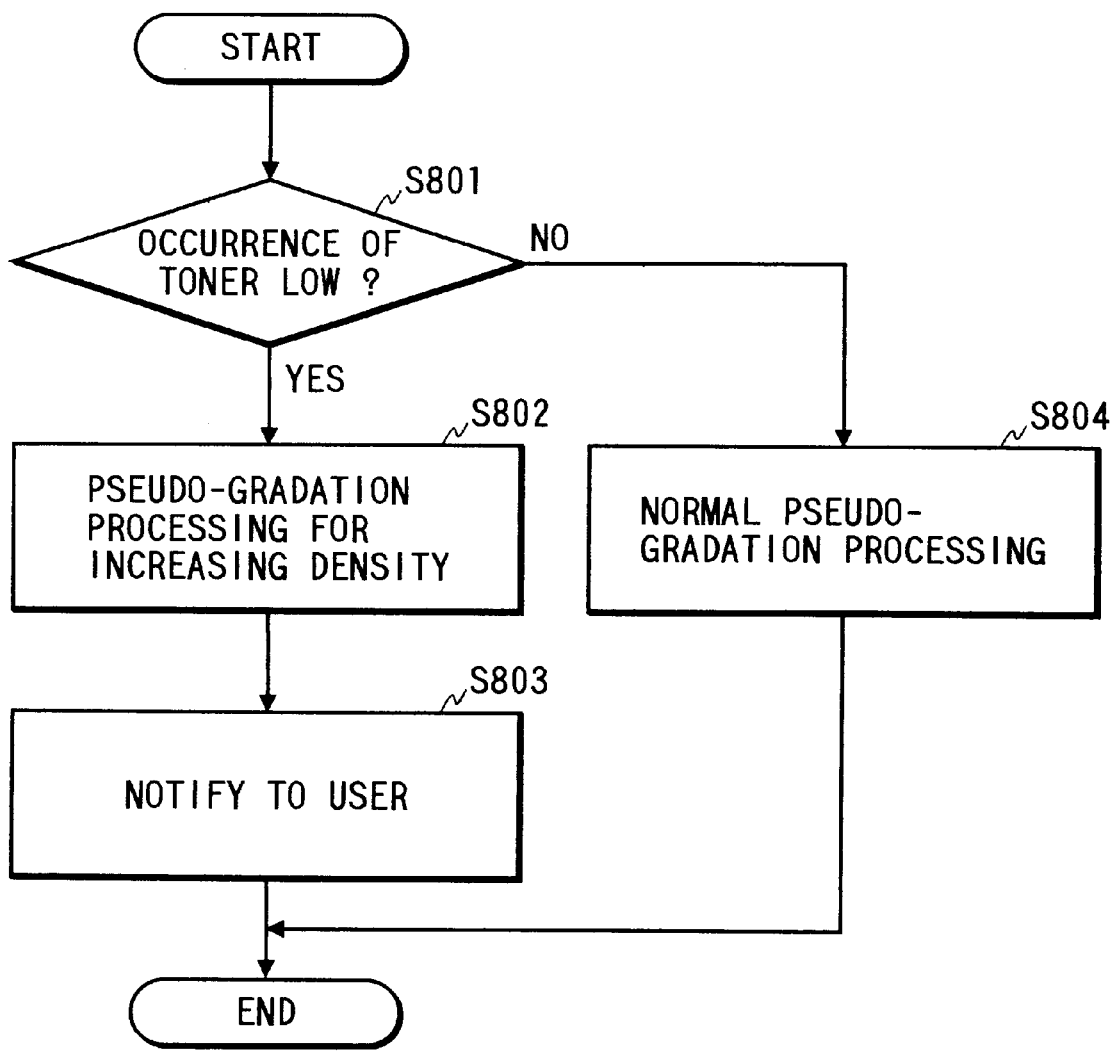
FIG. 19 is a flowchart showing a procedure of optimum processing selection for toner low to be executed by the printer controller in the laser beam printer of FIG. 13.

A description will be made next to how the printer controller 103 controls the engine 105 referring to FIGS. 17 to 19. FIG. 17 is a flowchart showing a procedure of page object generation executed by the printer controller in the laser beam printer of FIG. 13; FIG. 18 is a flowchart showing a procedure of video signal generation and transfer executed by the printer controller in the laser beam printer of FIG. 13; and FIG. 19 is a flowchart showing a procedure of optimum processing selection for toner low to be executed by the printer controller in the laser beam printer of FIG. 13.

As shown in FIG. 17, when print data is input from the external equipment 101 to the printer controller 103 (step S601), PDL analysis processing is executed (step S602).

Then, page object information for drawing the print data is generated on the basis of the result of the PDL analysis processing (step S603). The PDL analysis processing and the object information generation processing are repeated until all the print data are processed.

When all the print data input to the printer controller 103 are processed (step S601), the processing procedure is ended.

As shown in FIG. 18, rasterization processing is executed in parallel with the object information generation processing. In this program portion, engine transfer ready processing is first executed prior to the rasterization processing (step S701), in which color designation of MCYK, toner density designation and other necessary designation are performed to the engine 105.

Then, the rasterization processing is executed for each color M, C, Y and K in accordance with the generated object information to generate band data for each band (step S702).

After completion of the band data for one band (step S703), pseudo-gradation processing of designated color is executed by a dither pattern (step S704), and the designated color data is transferred to the engine 105 (step S705).

Then, determination is made as to whether or not the designated color data for one page have been completely transferred (step S706). If not completely transferred, the procedure returns to step S702 and subsequent processing steps are repeated until the color data for one page are completely transferred.

After completion of transfer of the designated color for one page, determination is made as to whether all the data of four colors M, C, Y and K have been transferred (step S707). If not completely transferred, the procedure returns to step S701 and subsequent processing steps are repeated until all the data of four colors are transferred. This processing is executed to the colors M, C, Y and K sequentially in this order.

After completion of transfer of all the data of four colors, the processing procedure is ended.

The engine 105 performs printing on the basis of the color data transferred from the printer controller 103. In this printing process, if toner low occurs (i.e., if the toner density falls below a given value), the engine control unit 106 outputs a /CCRT signal 423 of "TRUE" to the printer controller 103.

The printer controller 103 interrupts the current processing in response to the /CCRT signal 423 of "TRUE", and executes status change recognition processing to recognize a status change of the engine 105 in a processing that does not directly concern the /RDY signal 413. In the status change recognition processing, the /STS signal 421 in each processing is taken in from the engine 105, and the processing in which a status change occurs and its changed state are recognized on the basis of the /STS signal 421. In the embodiment, recognition of toner low in the engine 105 is taken by way of example to describe the present invention.

When recognizing occurrence of toner low in the engine 105, the printer controller 103 selects an optimum processing for the occurrence of toner low. The procedure for selecting the optimum processing is shown in FIG. 19.

As shown in FIG. 19, when occurrence of toner low is recognized (step S801), pseudo-gradation processing using a dither pattern widely painted out. By using such pseudo-gradation processing using a dither pattern widely painted out, the amount of toner is adjusted to prevent the print density from lowing.

Then the printer controller 103 performs display processing to make the panel unit 104 indicate that the pseudo-gradation processing using a dither pattern widely painted out has been executed instead of normal pseudo-gradation processing, and processing to notify the situation to the user through the external equipment 101 (step S803). After that, the processing procedure is ended.

When no occurrence of toner low is recognized (step S801), normal pseudo-gradation processing is executed (step S804) and the processing procedure is ended.

As discussed above, when a status change of the printer engine 105, i.e., toner low, that does not directly concern the /RDY signal occurs, the printer controller 103 selects pseudo-gradation processing for increasing the toner density as an optimum processing to cope with the occurrence of toner low, so that a printout equivalent to that before occurrence of toner low can be obtained. Thus the printer controller 103 can cope with the occurrence of toner low flexibly without stopping the operation of the engine 105.

Further, since the /CCRT signal 423 is used as a trigger signal for execution of the status recognition processing to recognize a status change that does not directly concern the /RDY signal, the signal /STS421 does not need to be always monitored by polling for recognition of status changes that do not directly concern the /RDY signal, and this makes it possible to recognize a status change in each processing without applying an increased load to the printer controller 103.

(Sixth Embodiment)

Figure 20:
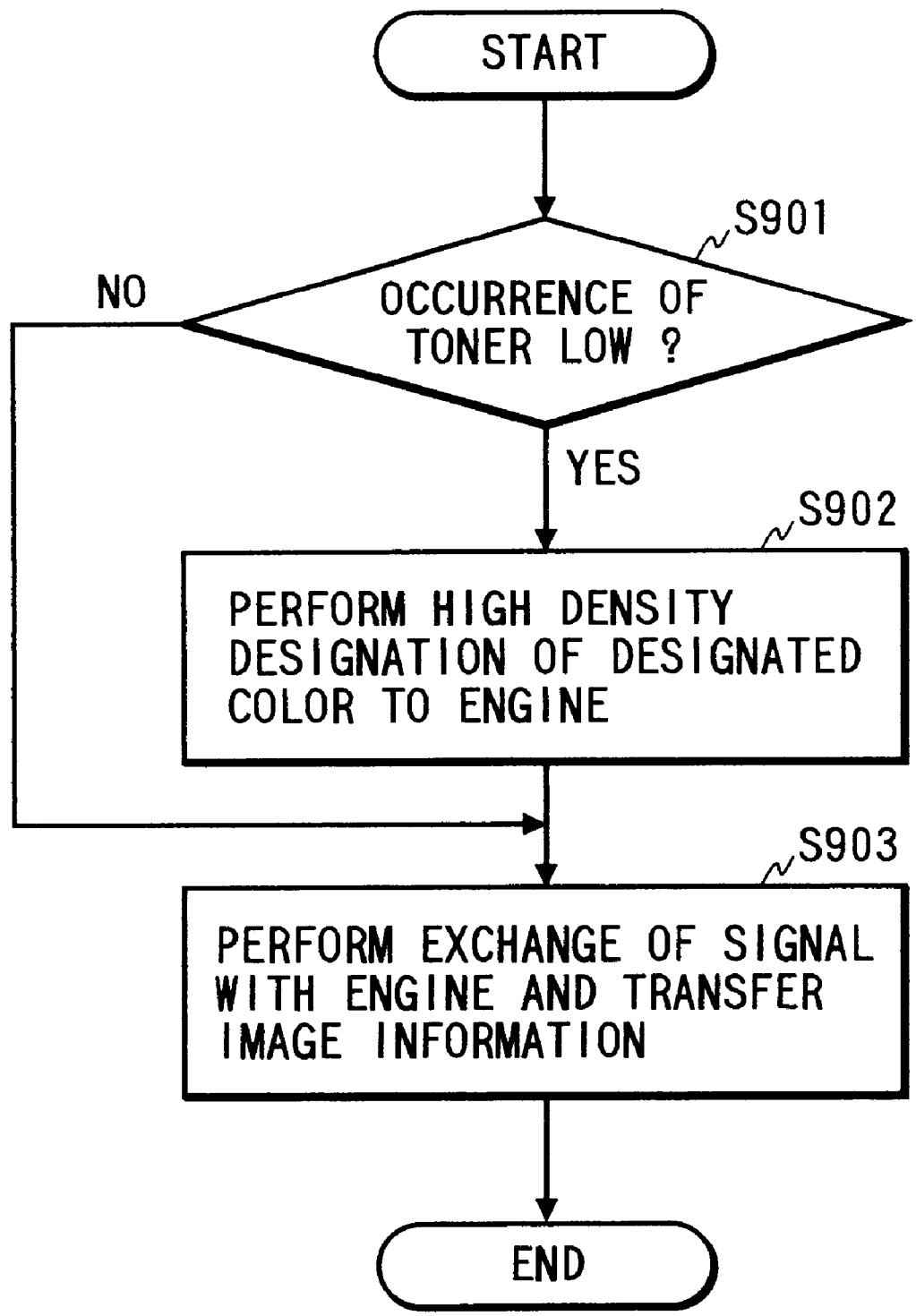
FIG. 20 is a flowchart showing a procedure of optimum processing selection for toner low to be executed by a printer controller in a laser beam printer according to the sixth embodiment.

Referring next to FIG. 20, a sixth embodiment of the present invention will be described. FIG. 20 is a flowchart showing a procedure of optimum processing selection for toner low to be executed by a printer controller in a laser beam printer according to the sixth embodiment.

The embodiment has the same structure as that according to the fifth embodiment. A point in which the sixth embodiment differs from the fifth embodiment is how to adjust the density. When toner low occurs, the fifth embodiment uses a dither pattern different from the normal one to adjust the density, but the sixth embodiment changes the density designation to the engine 105.

As shown in FIG. 20, when occurrence of toner low is recognized (step S901), the printer controller 103 performs density designation to the engine 105 such that the density of the designated color, where the toner low occurs, is made high (step S902). In this density designation, the density to be newly designated is higher than the density currently designated.

Then the printer controller 103 performs exchange of signal with the engine 105 to transfer image information thereto (step S903). After completion of transfer of the image information, the processing procedure is ended.

In the embodiment, the density is adjusted by changing the density designation to the engine 105, so that a printout equivalent to that before occurrence of toner low can be obtained.

(Seventh Embodiment)

Figure 21:
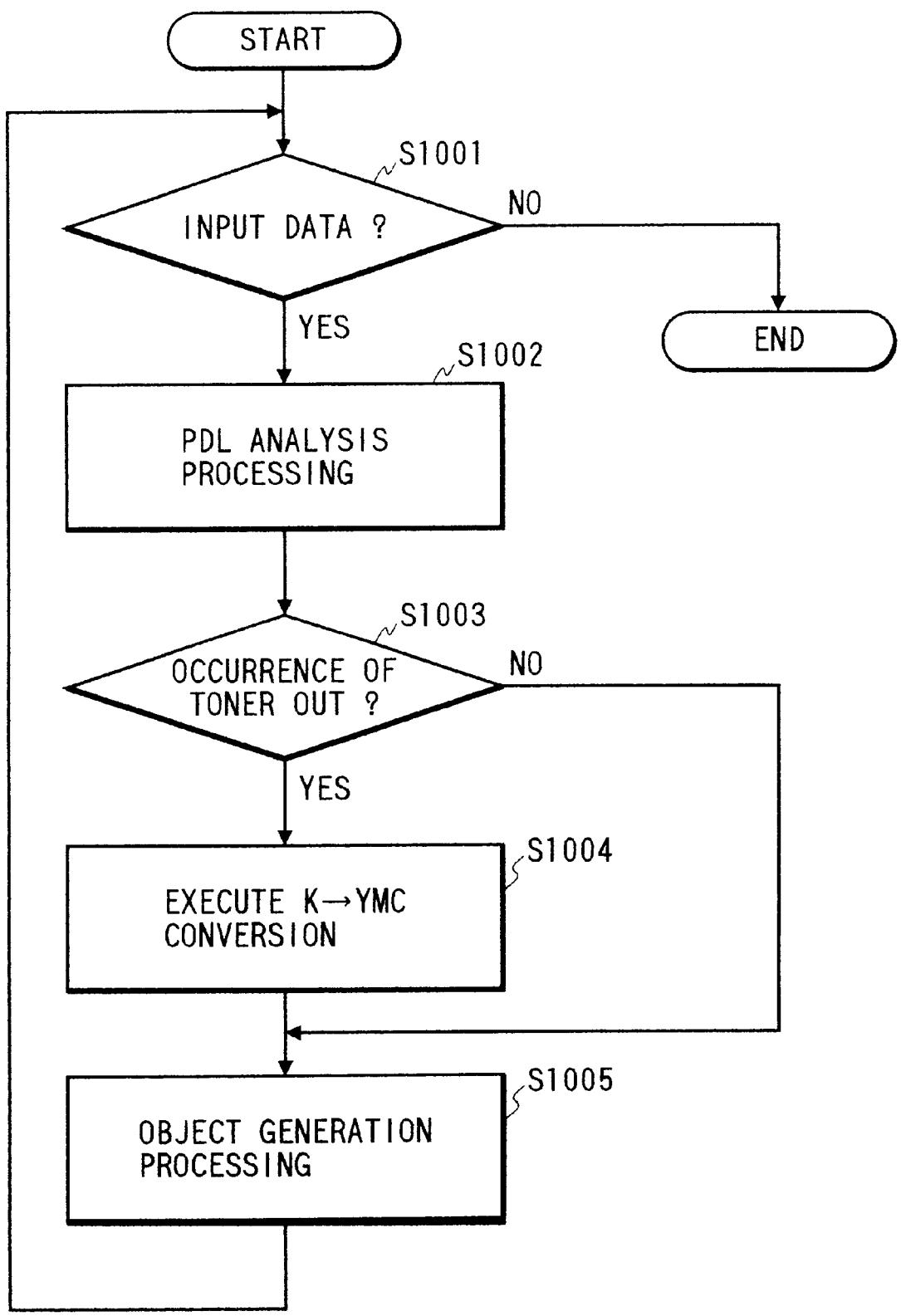
FIG. 21 is a flowchart showing a procedure of optimum processing selection for K toner out to be executed by a printer controller in a laser beam printer according to a seventh embodiment of the present invention.
Figure 23:
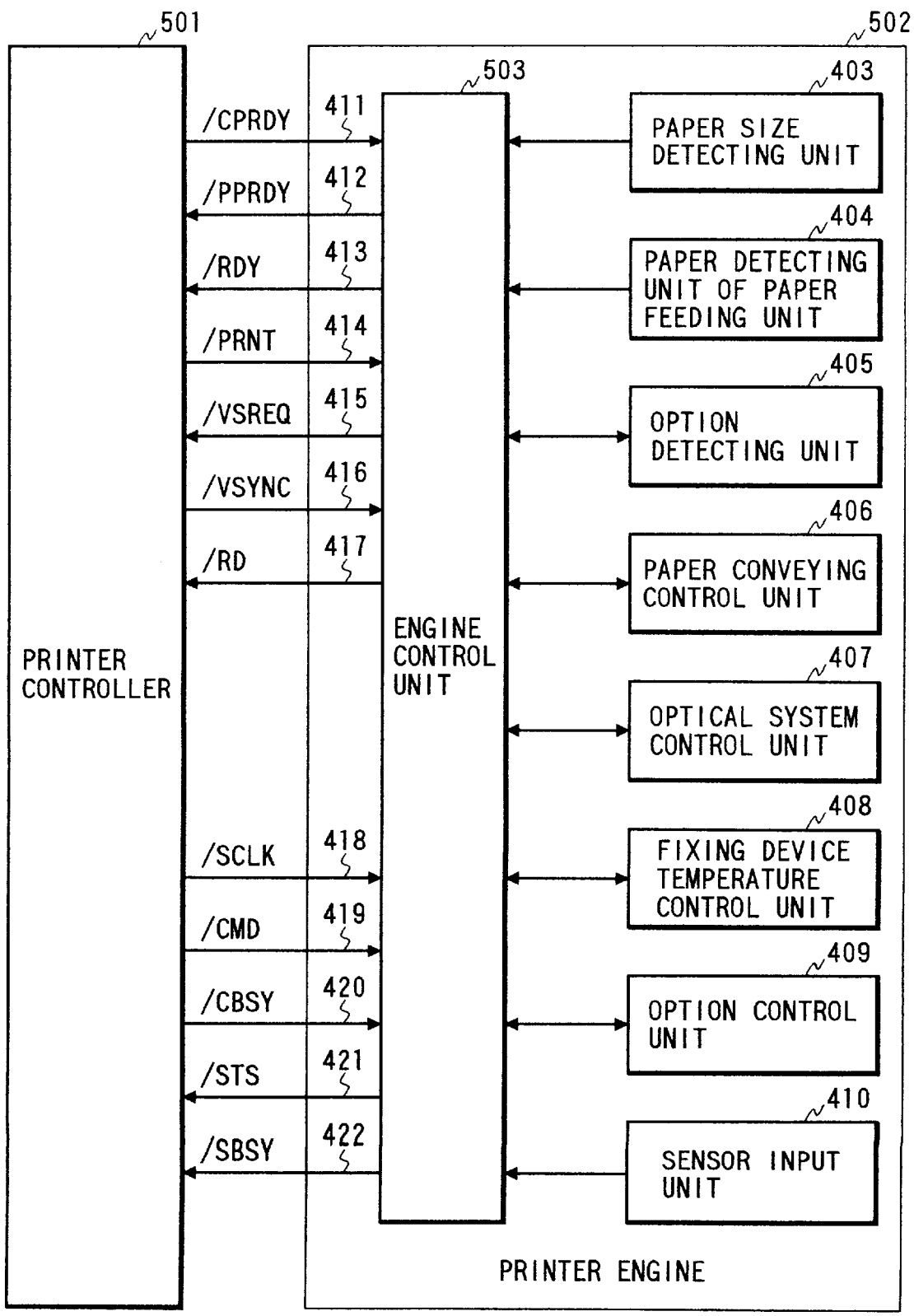
FIG. 23 is a block diagram showing a configuration of a printer controller and a printer engine in a conventional laser beam printer.

Referring next to FIGS. 21 and 22, a seventh embodiment of the present invention will be described. FIG. 21 is a flowchart showing a procedure of optimum processing selection for K toner out to be executed by a printer controller in a laser beam printer according to a seventh embodiment of the present invention; and FIG. 22 is a diagram showing a K-YMC conversion table for converting K information into the other color information, namely, Y, M and C information, included in object information.

The embodiment has the same structure as that in the first embodiment. A point in which the seventh embodiment differs from the first embodiment is as follows: when no K toner occurs, Y, M and C color information is used as object information instead of K information by converting the K information into the Y, M and C color information, and processing to transfer such object information to the engine 105 is selected, the object information including the Y, M and C color information instead of the K information. As shown in FIG. 22, the K-YMC conversion table is used to convert K information into Y, M and C color information. In other words, respective values of Y, M and C color information to be used instead of the K information is taken out from the table so that black data can be regenerated on the basis of the Y, M and C color information.

As shown in FIG. 21, when print data is input from the external equipment 101 to the printer controller 103 (step S1001), PDL analysis processing is executed (step S1002).

Then, determination is made as to whether or not K toner out occurs (step S1003). When occurrence of K toner out is recognized, Y, M and C color information to be used instead of the K information is read out from the K-YMC conversion table, and processing to convert the K information into the Y, M and C color information is executed (step S1004).

Then, page object information for drawing the print data is generated on the basis of the result of the PDL analysis processing (step S1005). Such color information Y', M', C' and K' included in the object information is given by the following equations.

$$Y' = Y + y$$

$$M' = M + m$$

$$C' = C + c$$

$$K' = 0$$

Since the Y, M and C color information is used instead of K information by converting the K information into the Y, M and C color information, respective values of the Y, M and C color information are set in the K-YMC conversion table to be higher density than those when K toner is used for black color.

After completion of generation of the object information for one page, the procedure returns to step S1001 and is repeated until all the print data input to the printer controller 103 are processed.

When occurrence of K toner out is not recognized (step S1003), page object information for drawing the print data is generated on the basis of the result of the PDL analysis processing without execution of the K-YMC conversion processing (step S1005).

When all the print data input to the printer controller 103 have been processed (step S1001), the processing procedure is ended.

As discussed above, when occurrence of K toner out is recognized, Y, M and C color information is used instead of K information by converting the K information into the Y, M and C color information, so that a printout equivalent to that before occurrence of K toner out can be obtained without stopping the operation of the engine 105.

In the sixth and seventh embodiments, although an optimum processing is selected for toner low or K toner out, a control method of selecting, as an optimum processing, pseudo-gradation processing for a change in color of printing paper can be added to the embodiments. In this case, detection means for detecting color of printing paper is provided in the engine 105 so as to cope with such a status change as the color of printing paper is changed. In other words, a /CCRT signal indicative of such a status change as the color of printing paper is changed is generated on the basis of the result of detection by the detection means for use as a trigger signal to recognize such a status change as the color of printing paper is changed. Thus, the pseudo-gradation processing for a change in color after changing the printing paper can be selected as an optimum processing.

Further, a sensor for detecting temperature or humidity abnormality can be provided in the engine 105. In this case, since the temperature or humidity abnormality is recognized through the sensor, a control method of selecting an optimum processing for the temperature or humidity abnormality can be added.

As described above, although the embodiments was taken by way of example to describe the present invention, the present invention is not limited to the embodiments and various modifications are possible within the scope of the appended claims.

What is claimed is:

1. An image processing apparatus comprising:

transmission means for transmitting data to image output means;

obtaining means for obtaining from the image output means status information representing a status thereof; and binarization means for binarizing multi-value image data into binary image data, said binarization means comprising memory means for storing a plurality of threshold matrices in correspondence to respective different statuses of the image output means and selection means for selecting based on the status information obtained by said obtaining means one of the plurality of threshold matrices stored in said memory means such that degradation of output image due to the status of the image output means may be eliminated, wherein said binarization means binarizes the multi-value image data into the binary image data using the one threshold matrix selected by said selection means, wherein said transmission means transmits the binary image data to the image output means.

2. An apparatus according to claim 1, further comprising:

input means for inputting data received from an external apparatus; and generation means for generating the multi-value image data from the data input by said input means.

3. An apparatus according to claim 1, further comprising discrimination means for discriminating an image type in each image area, wherein said selection means selects the one threshold matrix based on the obtained status information and the image type discriminated by said discrimination means.

4. An apparatus according to claim 1, further comprising conversion means for converting gradation characteristics of image data using one of a plurality of different conversion methods in response to the obtained status information.

5. An apparatus according to claim 1, wherein the status information representing at least one of a toner-low status, an age-changed status and material of a recording medium.

6. An apparatus according to claim 5, further comprising:

input means for inputting data received from an external apparatus; and generation means for generating the multi-value image data from the data input by said input means.

7. An apparatus according to claim 5, further comprising discrimination means for discriminating an image type in each image area, wherein said selection means selects the one threshold matrix based on the obtained status information and the image type discriminated by said discrimination means.

8. An apparatus according to claim 5, further comprising conversion means for converting gradation characteristics of image data using one of a plurality of different conversion methods in response to the obtained status information.

9. An apparatus according to claim 1, further comprising the image output means.

10. An apparatus according to claim 9, wherein said image output means comprises means for forming an image on a recording medium by electrographic recording.

11. A method carried out in an image processing apparatus having a transmission means for transmitting image data to an image output means, comprising the steps of:

obtaining from the image output means status information representing a status thereof; and binarizing multi-value image data into binary image data, wherein said binarizing step comprises storing a plurality of threshold matrices in correspondence to respective different statuses of the image output means and selecting based on the obtained status information one of the plurality of stored threshold matrices such that degradation of output image due to the status of the image output means may be eliminated, wherein said binarizing step binarizes the multi-value image data into the binary image data using the selected one threshold matrix.

12. A method according to claim 11, further comprising the steps of:

inputting data received from an external apparatus; and generating the multi-value image data from the input data.

13. A method according to claim 11, further comprising the step of discriminating an image type in each image area, wherein said selecting step selects the one threshold matrix based on the obtained status information and the discriminated image type.

14. A method according to claim 11, further comprising the step of converting gradation characteristic of image data using one of a plurality of different conversion methods in response to the obtained status information.

15. A method according to claim 11, wherein the status information representing at least one of a toner-low status, an age-changed status and material of a recording medium.

16. A method according to claim 15, further comprising the step of:

inputting data received from an external apparatus; and generating the multi-value image data from the input data.

17. A method according to claim 15, further comprising the step of discriminating an image type in each image area, wherein said selecting step selects the one threshold matrix based on the obtained status information and the discriminated image type.

18. A method according to claim 15, further comprising the step of converting gradation characteristic of image data using one of a plurality of different conversion methods in response to the obtained status information.

19. A method according to claim 11, further comprising the step of controlling the image output means to output image data.

20. A method according to claim 19, wherein said controlling step controls the image output means to form an image on a recording medium by electrographic recording.

\* \* \* \* \*

UNITED STATES PATENT AND TRADEMARK OFFICE
CERTIFICATE OF CORRECTION

PATENT NO.    : 6,100,996
DATED         : August 8, 2000
INVENTOR(S)   : Yasuko Amano, et al.

It is certified that error appears in the above-identified patent and that said Letters Patent is hereby corrected as shown below:

ON THE TITLE PAGE

At [56], Attorney, Agent or Firm: "Fitzpatrick, Cella, Haper & Scinto", should read --Fitzpatrick, Cella, Harper & Scinto--.

At [57], Abstract, line 4: "confirms the printer" should read --confirms to the printer--.

Column 1
Line 21, "conventional" should read --conventional system--; and
Line 27, "conventional" should read --conventional system--.

Column 2
Line 46, "envelop" should read --envelope--;
Line 49, "envelop" should read --envelope--; and
Line 52, "envelop" should read --envelope--.

COLUMN 3
Line 23, "includes" should read --include--; and
Line 62, "next to" should read --next as to--.

UNITED STATES PATENT AND TRADEMARK OFFICE
CERTIFICATE OF CORRECTION

PATENT NO. : 6,100,996
DATED : August 8, 2000
INVENTOR(S) : Yasuko Amano, et al.

It is certified that error appears in the above-identified patent and that said Letters Patent is hereby corrected as shown below:

Column 5
Line 66, "determines which" should read --determines in which --.

Column 12
Line 10, "used" should read --is used--;
Line 47, "form" should read --forms--;
Line 50, "as used" should read --as is used--;
Line 52, "as used" should read --as is used--;
Line 54, "unit 18, for" should read --unit 18. For--; and
Line 56, "as used" should read --as is used--.

Column 14
Line 64, "image" should read --images--; and
Line 65, "becomes" should read --become--.

Column 18
Line 11, "an" should read --as an--.

Column 20
Line 7, "such" should be deleted.

UNITED STATES PATENT AND TRADEMARK OFFICE
CERTIFICATE OF CORRECTION

PATENT NO. : 6,100,996
DATED : August 8, 2000
INVENTOR(S) : Yasuko Amano, et al.

It is certified that error appears in the above-identified patent and that said Letters Patent is hereby corrected as shown below:

Column 21
Line 4, "envelop" should read --envelope--;
Line 7, "envelop" should read --envelope--;
Line 10, "envelop" should read --envelope--;
Line 47, "includes" should read --include--; and
Line 51, "ReporT)." should read --Report).--.

Column 22
Line 57, "designation" should read --designations--.

Column 23
Line 36, "out." should read --out is performed--.

Column 25
Line 53, "was" should read --were--.

Column 26
Line 32, "representing" should read --represents--.

UNITED STATES PATENT AND TRADEMARK OFFICE
CERTIFICATE OF CORRECTION

PATENT NO. : 6,100,996
DATED : August 8, 2000
INVENTOR(S) : Yasuko Amano et al.

It is certified that error appears in the above-identified patent and that said Letters Patent is hereby corrected as shown below:

<u>Column 27</u>
Line 17, "characteristic" should read --characteristics--; and
Line 21, "representing" should read --represents--.

<u>Column 28</u>
Line 11, "characteristic" should read --characteristics--.

Signed and Sealed this

Twelfth Day of June, 2001

*Attest:*

NICHOLAS P. GODICI
*Attesting Officer*     *Acting Director of the United States Patent and Trademark Office*